United States Patent [19]

Spenadel et al.

[11] Patent Number: 4,843,129
[45] Date of Patent: Jun. 27, 1989

[54] ELASTOMER-PLASTIC BLENDS

[75] Inventors: Lawrence Spenadel, Westfield; Joel H. Grosser, Perth Amboy; Stephen M. Dwyer, Howell, all of N.J.

[73] Assignee: Exxon Research & Engineering Company, Florham Park, N.J.

[21] Appl. No.: 835,211

[22] Filed: Mar. 3, 1986

Related U.S. Application Data

[63] Continuation-in-part of Ser. No. 813,980, Dec. 27, 1985, abandoned, Ser. No. 813,725, Dec. 27, 1985, and Ser. No. 813,848, Dec. 27, 1985, abandoned, which is a continuation-in-part of Ser. No. 681,950, Dec. 26, 1985, said Ser. No. 813,980, is a continuation-in-part of Ser. No. 813,511, Dec. 26, 1985, which is a continuation-in-part of Ser. No. 681,950, , which is a continuation-in-part of Ser. No. 504,582, Jun. 15, 1983, Pat. No. 4,540,753, said Ser. No. 813,725, is a continuation-in-part of Ser. No. 840,562, Dec. 26, 1985, which is a continuation-in-part of Ser. No. 681,951, Dec. 14, 1984, which is a continuation-in-part of Ser. No. 504,582.

[51] Int. Cl.⁴ .................... C08L 23/16; C08L 23/08
[52] U.S. Cl. .................... 525/240; 525/52; 525/88; 525/132; 525/146; 525/154; 525/177; 525/184; 525/222; 525/227; 525/239
[58] Field of Search ............... 525/240, 52, 132, 146, 525/88, 239, 154, 177, 184, 222, 227

[56] References Cited

U.S. PATENT DOCUMENTS

| | | |
|---|---|---|
| 3,262,992 | 7/1966 | Holzer et al. . |
| 3,468,979 | 9/1969 | Hamed et al. . |
| 3,629,212 | 12/1971 | Benedikter et al. . |
| 3,662,548 | 11/1971 | Emde et al. . |
| 3,697,429 | 10/1972 | Engel et al. . |
| 3,723,348 | 3/1973 | Apotheker et al. . |
| 3,879,494 | 4/1975 | Milkovitch . |
| 3,884,993 | 5/1975 | Gros . |
| 3,937,758 | 2/1976 | Castacna . |
| 4,059,651 | 11/1977 | Smith, Jr. ............... 525/211 |
| 4,087,485 | 5/1978 | Huff ........................ 525/240 |
| 4,087,486 | 5/1978 | Fielding et al. ......... 525/240 |
| 4,130,535 | 12/1978 | Coran et al. ............ 525/211 |
| 4,168,358 | 9/1979 | Harada et al. . |
| 4,181,790 | 1/1980 | Maaks et al. . |
| 4,221,882 | 9/1980 | Huff ........................ 525/197 |
| 4,251,646 | 2/1981 | Smith, Jr. ............... 525/88 |
| 4,311,628 | 1/1982 | Abdou-Sabet et al. .. 525/232 |
| 4,361,686 | 11/1982 | Zarr et al. . |
| 4,375,531 | 3/1983 | Ross ....................... 525/93 |
| 4,429,079 | 1/1984 | Shibata et al. . |
| 4,495,334 | 1/1985 | Matsuura et al. ...... 525/240 |
| 4,499,241 | 2/1985 | Yoshimura et al. .... 525/240 |
| 4,540,753 | 9/1985 | Cozewith et al. ...... 526/88 |

FOREIGN PATENT DOCUMENTS

| | | | |
|---|---|---|---|
| 0067138 | 12/1982 | European Pat. Off. ...... | 525/240 |
| 0159842 | 9/1984 | Japan ......................... | 525/240 |
| 0016943 | 1/1986 | Japan ......................... | 525/240 |
| 1160791 | 8/1969 | United Kingdom . | |

OTHER PUBLICATIONS

Ferdinand C. Stehling, Terry Huff, C. Stanley Speed, and G. Wissler, *Journal of Applied Polymer Science*, vol. 26, "Structure and Properties of Rubber-Modified Polypropylene Impact Blends," John Wiley & Sons, Inc. (1981), pp. 2693-2711.
"Polyolefin Elastomers"-Natta et al., pp. 1583-1668.
"The Effect of Molecular Weight and Molecular Weight Distribution of the Non-Newtownian Behavior of Ethylene Propylene Diene Polymers"-Shih et al., Tables I and II.

*Primary Examiner*—Wilbert J. Briggs, Sr.
*Attorney, Agent, or Firm*—S. H. Markowitz; W. G. Muller

[57] ABSTRACT

A composition comprising:
  (a) at least one copolymer having at least one of $\overline{M}_w/\overline{M}_n$ less than 2 and $\overline{M}_z/\overline{M}_w$ less than 1.8; and
  (b) at least one plastic composition.

The composition can be produced by preparing the elastomer and then blending it with the plastic. The composition can be subjected to an additional step of curing.

17 Claims, No Drawings

ELASTOMER-PLASTIC BLENDS

BACKGROUND OF THE INVENTION

The following information pertains to related applications.

This Application is a continuation-in-part of the application Ser. No. 813;980, was filed Dec. 27, 1985, now abandoned, application Ser. No. 813,725 was filed Dec. 27, 1985 application Ser. No. 813,848 was filed Dec. 27, 1985 now abandoned.

Application Ser. No. 813,725 is a continuation-in-part of application Ser. No. 840,562, filed Dec. 26, 1985, which is a continuation-in-part of application Ser. No. 681,951, filed Dec. 14, 1984, which is a continuation-in-part of U.S. Pat. No. 4,540,753, Ser. No. 504,582, filed June 15, 1983 and issued Sept. 10, 1985.

Application Ser. No. 813,980 is a continuation-in-part of application Ser. No. 513,511, filed Dec. 26, 1985, which is a continuation-in-part of application Ser. No. 681,950, filed Dec. 14, 1984, which is a continuation-in-part of Ser. No. 504,582.

Application Ser. No. 813,848, filed Dec. 27, 1985, is also a continuation-in-part of application Ser. No. 681,950.

Application Ser. No. 745,873, filed June 17, 1985, now U.S. Pat. No. 4,792,595, is a division of Ser. No. 504,582.

The disclosures of the '753 patent and the applications listed above are hereby incorporated herein by reference.

FIELD OF THE INVENTION

The invention relates to novel blends of elastomers and plastic compositions, and to novel processes for producing such blends.

More specifically, the plastics which may be employed in these blends include polypropylenes, polyethylenes, including high density polyethenes, low density polyethylenes, and linear low density polyethylenes, polystyrenes, polyvinyl chlorides, polycarbonates, polyamides (nylons), polyesters, polyphenylene oxides, ethylene/methylacrylate copolymers, polybutylenes, polyvinyl acetates, ethylene/vinyl acetate copolymers, polymethyl methacrylates, acrylonitrile-butadiene-styrenes, acetals, alkyds, acrylics, polyethyl methacrylates, and heteroblock propylene-ethylene copolymers. Also suitable are mixtures of two or more of such plastic compositions, especially mixtures of polypropylene and polyethylene, including high density polyethylene (HDPE), low density polyethylene (LDPE), and linear low density polyethylene.

Among the suitable polypropylenes are those disclosed in SMITH, Jr. (U.S. Pat. No. 4,059,651), HUFF (U.S. Pat. No. 4,087,485), FIELDING et al. (U.S. Pat. No. 4,087,486), HUFF (U.S. Pat. No. 4,221,882), SMITH, Jr. (U.S. Pat. No. 4,251,646), and ROSS (U.S. Pat. No. 4,375,531), the disclosures of which are hereby incorporated by reference thereto.

Suitable elastomers for use in the blend are the compositions disclosed in COZEWITH et al. (U.S. Pat. No. 4,540,753), (hereinafter referred to as COZEWITH et al.), and application Ser. Nos. 745,873, 681,950, 813,511, 681,951, 302,596 now U.S. Pat. No. 4,381,567, 813,848, 813,980, and 813,725.

BACKGROUND DESCRIPTION OF RELEVANT MATERIALS

For convenience, certain terms that are repeated throughout the present specification are defined below:

(a) Inter-CD defines the compositional variation, in terms of ethylene content, among polymer chains. It is expressed as the minimum deviation (analogous to a standard deviation) in terms of weight percent ethylene from the average ethylene composition for a given copolymer sample needed to include a given weight percent of the total copolymer sample which is obtained by excluding equal weight fractions from both ends of the distribution. The deviation need not be symmetrical. When expressed as a single number, for example 15% Inter-CD, it shall mean the larger of the positive or negative deviations. For example, for a Gaussian compositional distribution, 95.5% of the polymer is within 20 wt.% ethylene of the mean if the standard deviation is 10%. The Inter-CD for 95.5% wt.% of the polymer is 20 wt.% ethylene for such a sample.

(b) Intra-CD is the compositional variation, in terms of ethylene, within a copolymer chain. It is expressed as the minimum difference in weight (wt.) % ethylene that exists between two portions of a single copolymer chain, each portion comprising at least 5 weight % of the chain.

(c) Molecular weight distribution (MWD) is given a measure of the range of molecular weights within a given copolymer sample. It is characterized in terms of at least one of the ratios of weight average to number average molecular weight, $\overline{M}_w/\overline{M}_n$, and Z average to weight average molecular weight, $\overline{M}_z/\overline{M}_w$, where $$M_w = \frac{NiMi^2}{NiMi}$$

$$M_n = \frac{NiMi}{Ni}, \text{ and}$$

$$M_z = \frac{NiMi^3}{NiMi^2}, \text{ wherein}$$

Ni is the number of molecules of weight Mi.

Ethylene-propylene copolymers, particularly elastomers, are important commercial products. Two basic types of ethylene-propylene copolymers are commercially available. Ethylene-propylene copolymers (EPM) are saturated compounds requiring vulcanization with free radical generators such as organic peroxides. Ethylene-propylene terpolymers (EPDM) contain a small amount of non-conjugated diolefin, such as dicyclopentadiene, 1,4-hexadiene, or ethylidene norbornene, which provides sufficient unsaturation to permit vulcanization with sulfur. Such polymers that include at least two monomers, i.e., EPM and EPDM, will hereinafter be collectively referred to as copolymers.

These copolymers have outstanding resistance to weathering, good heat aging properties and the ability to be compounded with large quantities of fillers and plasticizers, resulting in low cost compounds which are particularly useful in automotive and industrial mechanical good applications. Typical automotive uses are in tire sidewalls, inner tubes, radiator and heater hose, vacuum tubing, weather stripping and sponge doorseals, and as Viscosity Index (V.I.) improvers for lubricating oil compositions. Typical mechanical goods uses are for appliance, industrial and garden hoses, both molded and extruded sponge parts, gaskets and seals, and conveyor belt covers. These copolymers also find use in adhesives, appliance parts, as in hoses and gaskets, wire and cable, and plastics blending.

The efficiency of peroxide curing depends on composition. As the ethylene level increases, it can be shown that the "chemical" crosslinks per peroxide molecule increase. Ethylene content also influences the rheological and processing properties, because crystallinity, which acts as physical crosslinks, can be introduced. The crystallinity present at very high ethylene contents may hinder processibility, and may make the cured product too "hard" at temperatures below the crystalline melting point to be useful as a rubber.

As can be seen from the above, based on their respective properties, EPM and EPDM find many, varied uses. It is known that the properties of such copolymers which make them useful in a particular application are, in turn, determined by their composition and structure. For example, the ultimate properties of an EPM or EPDM copolymer are determined by such factors as composition, compositional distribution, sequence distribution, molecular weight, and molecular weight distribution (MWD).

It is well known that the breadth of the MWD can be characterized by the ratios of various molecular weight averages. One of such averages is the ratio of weight average to number average molecular weight ($\overline{M}_w/\overline{M}_n$). Another of the ratios is the Z average molecular weight to weight average molecular weight ($\overline{M}_z/\overline{M}_w$).

Copolymers of ethylene and at least one other alpha-olefin monomer, including EPM and EPDM polymers, which are intramolecularly heterogeneous and intermolecularly homogeneous, and which have a narrow MWD, characterized as at least one of $\overline{M}_w/\overline{M}_n$ less than 2 and $\overline{M}_z/\overline{M}_w$ less than 1.8, have improved properties in lubricating oil. Such copolymers are disclosed in COZEWITH et al., which is incorporated herein by reference. For convenience, such polymers are hereinafter referred to as narrow MWD copolymers. Copolymers having MWD with both $\overline{M}_w/\overline{M}_n$ greater than or equal to 2 and $\overline{M}_z/\overline{M}_w$ greater than or equal to 1.8 are hereinafter referred to as broad MWD copolymers.

It is generally recognized that the cure rate and physical properties of copolymers of ethylene and at least one other alpha-olefin monomer are improved as MWD is narrowed. Narrow MWD polymers have superior cure and tensile strength characteristics over such polymers having broader MWD. However, the advantages in physical properties gained from having a narrow MWD are sometimes offset by the poorer processability of such materials. They are often difficult to extrude, mill, or calendar. Nevertheless, is certain instances the narrow MWD copolymer is advantageous in plastics blending.

As to milling behavior of EPM or EPDM copolymers, this property varies radically with MWD. Narrow MWD copolymers crumble on a mill, whereas broad MWD materials will band under conditions encountered in normal processing equipment. Broader MWD copolymer has a substantially lower viscosity than narrower MWD polymer of the same weight average molecular weight.

Thus, there exists a continuing need for discovering polymers with unique properties and compositions.

This is easily exemplified with reference to the area of blends of elastomers and plastics having various utilities.

Plastic-elastomer blends comprising a discontinuous phase of the elastomer dispersed within a continuous phase of the plastic find various uses, such as in battery cases. For such blends, an intimate dispersion of the elastomer discontinuous phase within the plastic composition continuous phase is a desirable property.

Blends comprising cocontinuous phases of plastic and elastomer tend to have greater impact strength than the pure plastic compositions, and are useful in such products as automobile bumpers.

It is highly desirable in plastic-elastomer blends, particularly the continuous-discontinuous phases blends, to attain a higher Gardner impact strength without a corresponding lowering of knit line toughness or stiffness.

U.S. Pat. No. 4,059,651 discloses a blend of 70–98 wt.% polypropylene, 2–30 wt.% EPDM elastomer, and halogenated phenol aldehyde resin present in an amount of about 1–20 parts per 100 parts of elastomer. The elastomer is disclosed as containing about 40–80 wt.% ethylene and about 2–12 wt.% diene with the balance being propylene. The components are mixed by conventional techniques and heated at above the melting point of the propylene, e.g., 300°–400° F. Alternatively, the halogenated phenol aldehyde resin may first be mixed with the polypropylene at these same temperatures, with the elastomer mixed in thereafter. After the mixing and heating, the blend may be molded.

U.S. Pat. No. 4,087,485 to Huff discloses a blend comprising about 2–20% by weight ethyelene-propylene copolymer elastomer, 70–90% by weight polypropylene, and about 1–15% by weight LDPE. The elastomer may further include a non-conjugated diene. The blend may be prepared by mixing with conventional equipment at 350°–400° F. for about 4–7 minutes, with conventional agents employed for curing.

U.S. Pat. No. 4,088,714 to Huff discloses a blend comprising 40–90 wt.% EPR, EPM, or EPDM copolymer, 14–20 wt.% cross-linkable low density polyethyelene, and less than 50 wt.% isotactic polypropylene. Three radical generating or cross-linking agents such organic peroxides are used to cross-link the elastomer and the cross-linkable low density polyethylene. Triallylcyanurate is employed to enhance the curing and increase resiliency, tensile strength, and impact strength.

U.S. Pat. No. 4,221,882 to Huff discloses blends comprising 45–67% polypropylene, 30–45% polyethylene, and 3.5–11% ethylene-propylene copolymer. The polypropylene and ethylene-propylene compolymer are premixed by conventional means and heated to about 204° C. The pre-blend is then pelletized or powdered and mixed with virgin high density polyethylene, and melt-mixed as an extruder let down, normally at about 204° C. The final blend is then employed for molding parts.

U.S. Pat. No. 4,251,646 to Smith, Jr. discloses a blend of 60–90% by weight polypropylene, 30–5% by weight thermoplastic crystalline heteroblock propylene-ethylene copolymer, and 30–5% ethylene-propylene copolymer. The blends are processed by conventional techniques at temperatures above 200° C., are readily extrudable and moldable.

U.S. Pat. No. 4,375,531 to Ross discloses visbroken polymeric blends comprising a first component selected from a group consisting of block propylene-ethylene copolymers, reactormade intimate mixtures of polypropylene and randomly oriented copolymers of propylene and ethylene, and blends of propylene and randomly oriented copolymers of propylene and ethylene, and a second component selected from the group consisting of low density polyethylene, ethylene-vinyl acetate copolymer, acrylate-modified polyethylenes, high density polyethylenes, ethylene-propylene rubber (EPR or EPDM), and blends thereof. The method for producing the composition comprises first blending the components, and then visbreaking the resulting blend. The visbreaking may be carried out in the presence of peroxide concentrations of 50–2,000 ppm, and melt temperatures of 350°–550° F., in a single or twin screw extruder. Thermal visbreaking, at temperatures in excess of 550° F. and the absence of free radial initiators and process or heat stabilizer additives, can also be used.

"Structure and Properties of Rubber Modified Polypropylene Impact Blends,", F. C. Stehling, T. Huff, C. S. Speed, and G. Wissler, *Journal of Applied Polymer Science*, Vol. 26, pp. 2693–2711 (1981), discloses the dispersion of poly(ethylene-co-propylene) (PEP) rubber and high density polyethylene (HDPE) in polypropylene (PP) blends. Various PP-PEP blends, such as 90–10, 85–15, and 80–20 L wt.% ratios, and PP-PEP-HDPE blends including 80–10–10, 85–7.5–7.5, and 90–5–5 wt.% ratios, were studied. In such ratios, PEP was dispersed at a discontinuous phase within a continuous phase of PP in the two component blends. In the three component blends, a discontinuous phase of particles of PEP and HDPE was dispersed within a continuous phase of PP; the particles of the discontinuous phase comprised an interior region of HDPE surrounded by an outer layer of PEP.

None of these references discloses or suggests the use of the elastomer compositions disclosed in the COZEWITH et al. patent or applications in such plastic-elastomer blends.

SUMMARY OF THE INVENTION

It is, therefore, an object of the invention to provide and novel and improved elastomer-plastic blends, utilizing the elastomer compositions disclosed in the COZEWITH et al. patent and applications.

According to the invention, an elastomer-plastic composition is provided which comprises:
 (a) at least one copolymer having at least $\overline{M}_w/\overline{M}_n$ less than 2 and a $\overline{M}_z/\overline{M}_w$ less than 1.8; and
 (b) at least one plastic composition. Preferably, the at least one copolyme has $\overline{M}_w/\overline{M}_n$ less than 1.4 and $\overline{M}_z/\overline{M}_w$ less than 1.3.

The at least one copolymer may comprise ethylene and alpha-olefin monomer. Preferably, the alpha-olefin monomer contains 3–18 carbon atoms. Most preferably, it is propylene.

Ninety-five (95) wt.% of the copolymer chains of the copolymer may have an ethylene composition that differs from its average weight percent ethylene composition by not more than 15 wt.%, and at least two portions of essentially each copolymer chain of the first copolymer, each portion comprising at least 5 wt.% of the chain, may differ in composition from one another by at least about 5 wt.% ethylene.

The copolymer may be an ethylene propylene terpolymer, which may comprise ethylene, propylene, and a non-conjugated diene selected from the group consisting of ethylidene norborene, 1,4-hexadiene, dicyclopentadiene, vinyl norbornene, methylene norbornene, and mixtures thereof.

The plastic composition may be a thermoplastic composition, and may further be selected from a group consisting of polypropylenes, polyethylenes, ethylene/vinyl acetate copolymers, polyamides, polyphenyl oxides, polycarbonates ethylene/methyl acrylate copolymers, polymethyl methacrylates, polyvinyl chlorides, acrylonitrile-butadiene-styrenes, polyethyl methacrylates, polystyrenes, polybutylenes, polyesters, acetals, alkyds, polyvinyl acetates, acrylics, and heteroblock propylene-ethylene copolymers.

Preferably, the thermoplastic composition is polypropylene, or a heteroblock propylene-ethylene copolymer.

Where the thermoplastic composition is polypropylene, it preferably comprises approximately 98–50% by weight of the composition of the invention, with the at least one copolymer comprising approximately 2–50% by weight of the composition.

Where the thermoplastic composition is the heteroblock copolymer, this copolymer preferably comprises approximately 98–50% by weight of the composition. This heteroblock copolymer preferably comprises approximately 50–98% by weight propylene block and approximately 2–50% by weight post block of ethylene and propylene. This post block preferably comprises 20–78% by weight ethylene.

The composition of the invention may include two or more plastics, such as polyethylene and polypropylene.

In the composition in the invention, the one or more plastic compositions may take the form of a continuous phase, and the one or more copolymers may take the form of a discontinuous phase dispersed within this continuous phase.

In such an embodiment, such continuous phase is preferably polypropylene comprising at least 90 wt.% of the composition, and the discontinuous phase is ethylene-propylene copolymer, ethylene-propylene terpolymer, or a combination thereof, and comprises approximately 10 wt.% or less of the composition.

The composition of the invention may further take the form of a continuous phase comprising a first plastic composition, and a discontinuous phase, dispersed within this continuous phase, comprising a second plastic composition and at least one copolymer. In such an embodiment, the first plastic composition is preferably polypropylene, and the second plastic composition is preferably polyethylene; the copolymer is preferably an ethylene-propylene copolymer, an ethylene-propylene terpolymer, or mixtures thereof. Most preferably, the polyproylene comprises at least 85 wt.% of the composition, the polyethylene comprises approximately 5 wt.% or less of the composition, and the indicated copolymer or copolymers comprises approximately 10 wt.% or less of the composition.

The at least one copolymer of the composition of the invention may comprise a plurality of copolymer chains, substantially each of which comprises a first segment, being in the form of one contiguous or a plurality of discontinuous segments, comprising a copolymer of ethylene and an alpha-olefin; and a second segment comprising a copolymer of ethylene, an alpha-olefin, and a coupling agent, said second segment constituting less than 50% by weight of said copolymer chain and being in the form of one contiguous segment or a plurality of discontinuous segments. The coupling agent is cross-linkable under conditions which do not cross-link said first segment to any substantial extent. Preferably, this copolymer has at least one of $\overline{M}_w/\overline{M}_n$ less than 2 and a $\overline{M}_z/\overline{M}_w$ less than 1.8.

The indicated alpha-olefin may be propylene. The coupling agent may be a Ziegler copolymerizable diene preferaly selected from the group consisting of norbornadiene, vinyl norbornene, and butenyl norbornene. In the alternative, the coupling agent may be a cross-linkable diene preferably selected from the group consisting of ENB, 1,4-hexadiene and dicyclopentadiene.

The elastomer of the composition of the invention may comprise at least one nodular ethylene-alpha-olefin copolymer product of copolymer chains comprising a nodule region of substantial cross-linking of copolymer chains second segments, with substantially uncrossed-linked copolymer chain first segments extending therefrom. Preferably, the chain first segments of the nodular copolymer are in the form of one contiguous segment or a plurality of discontinuous segments, and comprise a copolymer chain of ethylene and an alpha-olefin, while the chain second segments comprise a copolymer of ethylene, alpha-olefin, and a coupling agent. Most preferably, these second segments constitute less than 50% by weight of each copolymer chain formed by the first and second segments, and are in the form of one contiguous segment or a plurality of discontinuous segments.

In this embodiment, the coupling agent may be a Ziegler copolymerizable diene, preferably selected from the group consisting of norbornadiene, vinyl norbornene, and butenyl norbornene. Alternatively, the coupling agent may be a cross-linkable diene, preferably selected from a group consisting of ENB, 1,4-hexadiene, and dicyclopentadiene.

The elastomer of the composition of the invention may comprise a copolymer of ethylene and at least one other alpha-olefin monomer, which copolymer is a superposition of two or more copolymers modes each having a MWD characterized by at least one of $\overline{M}_w/\overline{M}_n$ less than 2 and a $\overline{M}_z/\overline{M}_w$ less than 1.8. Preferably, the at least one other alpha-olefin monomer contains 3–18 carbon atoms.

This copolymer may consist essentially ethylene, propylene, and straight chain acyclic diene selected from the group consisting of 1,4-hexadiene and 1,6-octadiene. Alternatively, this copolymer may consist essentially of ethylene, propylene, and 5-ethylidene-2-norbornene.

The composition of the invention may comprise:
(a) an ethylene-alpha olefin copolymer;
(b) one or more plastic compositions; and
(c) at least one copolymer, in an amount equal to approximately 80 wt. % or less of the composition, comprising a plurality of Ziegler-Natta catalyzed polymer chains, substantially each of said chains being end capped with at least one functional group-containing unit which is otherwise essentially absent from said copolymer chains, said functional group being incorporated in a polymer selected from the group consisting of:

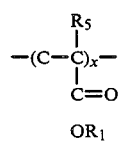

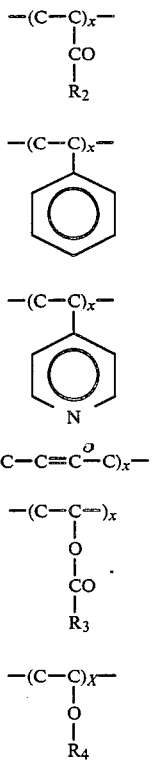

the monomers thereof, and the mixtures thereof; wherein $R_1$ through $R_4$ are hydrocarbons with 1–30 carbon atoms seleced from the group consisting of saturated or unsaturated, branched or unbranched, aliphatic, aromatic, cyclic, or polycyclic hydrocarbons, wherein $R_5$ is the same as $R_4$ but may additionally be hydrogen; and wherein x=1–10,000.

In the alternative, the at least one copolymer present in an amount equal to 80 wt.% or less of the composition may comprise a plurality of copolymer chains, substantially each of said chains being a Ziegler-natta catalyzed polymer chain end capped with at least one functional group-containing unit which is otherwise essentially absent from said polymer chain.

The indicated functional group may be selected from the group consisting —CO$_2$H, —OH, —SH, —X, —C—C—benzene, —C—C—(pyridine), —SO$_2$H, SO$_3$H, and mixtures thereof, wherein X is a halide selected from the group consisting of fluorine, chlorine, bromine, and iodine.

Alternatively this functional group may be selected from the group consisting of isocyanates, urethanes, nitriles, aromatic ethers and aromatic carbonates.

The indicated functional group containing unit may be selected from the group of polymers consisting of copolymers of ethylene and vinyl acetate; ethylene and acrylic acid esters; vinyl acetate and fumaric acid esters; styrene and maleic acid esters; olefins and maleic acid esters; homopolyacrylates; and epoxidized natural rubber.

The composition of the invention may further comprise:
(a) at least one copolymer which comprises a plurality of copolymer chains, substantially each comprising:

I. a first segment, being in the form of one contiguous segment or a plurality of discontinuous segments, comprising a copolymer of ethylene and an alpha-olefin; and II. a second segment comprising a copolymer of ethylene, an alpha-olefin, and at least one halogen-containing monomer selected from the group consisting of:

A. an olefinic chlorosilane of the formula $$SiRR_x'Cl_{3-x}$$

wherein:
(i) x is in the range 0–2;
(ii) R is a Ziegler copolymerizable olefin; and
(iii) R' is a hydrocarbon with 1–30 carbon atoms selected from the group consisting of saturated or unsaturated as well as branched or unbranched aliphatic, aromatic, cyclic, and polycyclic hydrocarbons;

B. an olefinic hydrocarbon halide of the formula $$RR'X$$

wherein:
(i) R is a Ziegler copolymerizable olefin; and
(ii) R' is a hydrocarbon with 1–30 carbon atoms selected from the group consisting of saturated or unsaturated as well as branched or unbranched aliphatic, aromatic, cyclic, and polycyclic hydrocarbons; and
(iii) X is a halogen;

said second segment constituting less than 50 percent by weight of said copolymer chain, said second segment being in the form of one contiguous segment or a plurality of discontinuous segments; said at least one halogen-containing monomer being cross-linkable under conditions which do not cross-link said first segment to any substantial extent; and (b) at least one plastic composition.

Alternatively, the elastomer of the composition of the invention may comprise:

(a) at least one copolymer consisting essentially of a plurality of copolymer chains having at least one of $\overline{M}_n/\overline{M}_n$ less than 2 and $\overline{M}_z/\overline{M}_w$ less than 1.8, said copolymer comprising ethylene, an alpha-olefin, and at least one halogen-containing monomer selected from the group consisting of:

I. an olefinic chlorosilane of the formula:

$$SiRR_x'Cl_{3-x}$$

wherein;
(i) x is in the range of 0–2;
(ii) R is a Ziegler copolymerizable olefin; and
(iii) R' is a hydrocarbon with 1–30 carbon atoms selected from the group consisting of saturated or unsaturated as well as branched or unbranched aliphatic, aromatic, cyclic, and polycyclic hydrocarbon; and II. an olefinic hydrocarbon halide of the formula:

$$RR'X$$

wherein:
(i) R is a Ziegler copolymerizable diene; and
(ii) R' is a hydrocarbon with 1–30 carbon atoms selected from the group consisting of saturated or unsaturated as well as branched or unbranched aliphatic, aromatic, cyclic, and polycyclic hydrocarbons; and
(iii) X is a halogen.

This copolymer may further comprise a non-conjugated diene selected from the group consisting of 5-ethylidene-2-norbornene, 1,4-hexadiene, dicylopentadiene, and mixtures thereof.

Further, in the alternative, the elastomer of the invention may comprise at least one nodular copolymer product of copolymer chains comprising:

A. A nodule region of substantial cross-linking of copolymer chain second segments substantially cross-linked by at least one cross-linking agent, substantially each of said second segments comprising a copolymer of ethylene, an alpha-olefin, and at least one halogen-containing monomer selected from the group consisting of:

(a) an olefinic chlorosilane of the formula $$SiRR_x'Cl_{3-x}$$

wherein:
(i) x is in the range 0–2;
(ii) R is a Ziegler copolymerizable olefin; and
(iii) R' is a hydrocarbon with 1–30 carbon atoms selected from the group consisting of saturated or unsaturated as well as branched or unbranched aliphatic, aromatic, cyclic, and polycyclic hydrocarbons; and (b) an olefinic hydrocarbon halide of the formula RR'X wherein:
(i) R is a Ziegler copolymerizable olefin;
(ii) R' is a hydrocarbon with 1–30 carbon atoms selected from the group consisting of saturated or unsaturated as well as branched or unbranched aliphatic, aromatic, cyclic, and polycyclic hydrocarbons;
(iii) X is a halogen; and B. substantially uncross-linked copolymer chain first segments extending therefrom, substantially each of said first segments comprising a copolymer of ethylene and an alpha-olefin;

said halogen-containing monomer being cross-linkable under conditions which do not cross-link said first segments to any substantial extent.

Where the indicated halogen-containing monomer is an olefinic chlorosilane, it may be selected from the group consisting of vinyl dimethylchlorosilane, vinyl ethyl dichlorosilane, 1-hexenyl-6-dimethylchlorosilane, 1-hexenyl-6-trichlorosilane, 1-octenyl-8-trichlorosilane, phenyl allyldichlorosilane, 5-trichlorosilyl-2-norbornene, and 5-methyldichlorosilyl-2-norbornene.

Where the indicated halogen-containing monomer is an olefinic hydrocarbon halide, it may be selectd from the group consisting of 5-chloromethyl-2-norbornene and 2-parachloromethylphenyl-5-norbornene.

These copolymers may be linked to the plastic through the indicated halogen-containing monomer. Where the halogen-containing monomer is an olefinic chlorosilane, such a link will form where the plastic composition is a polycarbonate, a polyamide, a polyester, a polyphenylene oxide, or an acetal. Where the halogen-containing monomer is an olefinic hydrocarbon halide, the link will form where the plastic composition is a polyamide.

The composition of the invention may also be subjected to curing.

The invention is also directed to the process for preparing the previously indicated compositions.

In one embodiment of the process, where the elastomer comprises a copolymer having at least one of $\overline{M}_w/\overline{M}_n$ less than 2 and $\overline{M}_z/\overline{M}_w$ less than 1.8, this elastomer is formed from a reaction mixture comprised of catalyst, ethylene, and at least one other alpha-olefin monomer, comprising conducting the polymerization of said at least one copolymer:

(a) in at least one mix-free reactor;
(b) with essentially one active catalyst species;
(c) using at least one reaction mixture which is essentially transfer-agent free;
(d) in such a manner and under conditions sufficient to initiate propagation of essentially all of said copolymer chains simultaneously, wherein chains of said at least one copolymer are dispersed within the reaction mixture.

This resulting elastomer is then blended with one or more plastics to form the composition of the invention.

In preparing the composition of the invention wherein the elastomer comprises a polymodal MWD copolymer, this copolymer may be prepared by varying the previously indicated reaction process by any one of several ways.

In one of these variations, reaction mixture is withdrawn from the reactor at at least two predetermined times after initiation of the polymerization and the copolymer withdrawn at each of said times is blended to form the polymodal MWD copolymer. Another variation employs at least two catalyst, each of which initiates the growth of polymer chains that obtain a different average molecular weight than that initiated by the other catalyst.

In a third alternative, at least two different mix-free reactors are employed to form the different modes which are then blended to produce the polymodal MWD copolymer.

In a fourth embodiment, the polymodal MWD copolymer is produced by adding a catalyst reactivator to the reaction mixture after polymerization has progressed for a finite period of time.

A fifth embodiment employs a catalyst system which generates multiple active catalyst species, each initiating the growth of polymer chains that obtain a different average molecular weight than those produced by other catalyst species.

To prepare a composition of the invention wherein the elastomer is a nodular compolymer, the previously indicated reaction process is varied by permitting the polymerization to continue to at least 50% completion, at which point a coupling agent is introduced into the reaction mixture. The reaction is thereafter permitted to continue, thereby incorporating the coupling agent into the polymer so as to form a nodular copolymer wherein the polymer chains are linked to the coupling agent. The product which results is blended with one or more plastics to produce the composition of the invention.

To prepare an elastomer for the composition of the blend comprising ethylene, one or more alpha-olefin monomers, and at least one halogen containing monomer selected from the group consisting of (a) olefinic chlorosilane of the formula

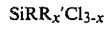

wherein;
(i) x is in the range 0–2;
(ii) R is a Ziegler compolymerizable olefin; and
(iii) R' is a hydrocarbon with 1–30 carbon atoms selected from the group consisting of saturated or unsaturated as well as branched or unbranched aliphatic aromatic cyclic, and polycyclic hydrocarbons; and (b) olefinic hydrocarbon halide of the formula RR'X wherein;
(i) R is a Ziegler copolymerizable olefin; and
(ii) R' is a hydrocarbon with 1–30 carbon atoms selected from the group consisting of saturated or unsaturated as well as branched or unbranched aliphatic, aromatic, cyclic, and polycyclic hydrocarbons; and
(iii) X is a halogen; wherein ethylene, one or more alpha-olefin monomers, and at least one of the previously indicated halogen-containing monomers are introduced into the previously described reaction process. The resulting copolymer is blended with one or more plastic compositions to produce the composition of the present invention.

A narrow-broad ethylene alpha-olefin copolymer, i.e., an ethylene alpha-olefin copolymer composition comprising:

(i) a first copolymer having at least one of $\overline{M}_w/\overline{M}_n$ less than 2 and $\overline{M}_z/\overline{M}_w$ less than 1.8; and
(ii) a second copolymer having both $\overline{M}_w/\overline{M}_n$ greater than or equal to 2 and $\overline{M}_z/\overline{M}_w$ greater than or equal to 1.8; may be prepared for incorporation into the composition of the invention by forming the first polymer by the previously described process, reacting a second reaction mixture to produce the second copolymer, and then blending the first and second copolymers to form the elastomer for use with the composition of the invention. Subsequently, this elastomer is blended with one or more plastic compositions to form the composition of the invention.

Any of these indicated processes may further be subjected to a curing step for curing the composition.

The blends of the invention can have utility in high impact applications. They can be employed in films, laminates, fabric coatings, tapes, and molded and extruded products, including sheet extrusion products.

The preferred elastomers for use in the blends of the invention are the single mode narrow MWD EPM and EPDM copolymers. The preferred plastic compositions are polypropylene, polyethylene, particularly high density polyethylene, polystyrene, ethylene/vinyl acetate copolymer, ethylene/methyl methacrylate copolymer, and heteroblock propylene-ethylene copolymers. The use of polypropylene and polyethylene together is also preferred.

Where the plastic composition of the invention is polypropylene, the blends preferably comprise approximately 2–50 weight percent elastomer and approximately 98–50 weight percent polypropylene.

Blends employing heteroblock propylene-ethylene copolymer preferably comprise approximately 2–50 weight percent of elastomer and approximately 98–50 weight percent of the heteroblock copolymer. The heteroblock copolymer preferably comprises approximately 50–98 weight percent, more preferably approximately 60–95 weight percent, of a polypropylene block, and preferably approximately 2–50 weight percent, more preferably approximately 5-40 weight percent of a post block of ethylene and propylene. The post block preferably comprises approximately 20-75 weight percent, more preferably 25-50 weight percent ethylene.

DETAILED DESCRIPTION OF THE INVENTION

The preferred COZEWITH et al. composition for use with the blends of this invention are the single mode narrow MWD copolymers, in particular the EPM and EPDM copolymers, as disclosed in U.S. Pat. No. 4,540,753.

These narrow MWD copolymers in accordance with the present invention are preferably made in a tubular or batch reactor operating under carefully controlled conditions.

As indicated in COZEWITH et al. at column 7, lines 4-36, when a tubular reactor is employed with monomer feed only at the tube inlet, ethylene will be preferentially polymerized. The result is copolymer chains with progressively lower ethylene and higher propylene concentration, as schematically presented below:

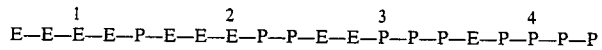

This resulting chain is intramolecularly heterogenous.

As indicated at column 7, lines 37-48, where more than two monomers are used in the production of the narrow and broader MWD copolymers, as in the production of EPDM, all properties related to homogeneity and hteterogeneity will refer to the relative ratio of ethylene to the other monomers in the chain. Further, as earlier indicated, the property related to intramolecular compositional dispersity shall be referred to as Intra-CD, and the property related to intermolecular compositional dispersity shall be referred to as Inter-CD.

The preferred copolymers for the narrow MWD copolymers are comprised of ethylene and at least one other alpha-olefin. It is believed that such alpha-olefins may include those containing 3 to 18 carbon atoms, e.g., propylene, butene-1, pentene-1, etc. Alpha-olefins of 3 to 6 carbons are preferred due to economic considerations. The most preferred copolymers for the narrow MWD copolymers are those comprised of ethylene and propylene, or of ethylene, propylene and diene.

As is well known to those skilled in the art, copolymers of ethylene and higher alpha-olefins such as propylene often include other polymerizable monomers. Typical of these other monomers may be non-conjugated dienes such as the following non-limiting examples:

a. straight chain acyclic dienes such as: 1,4-hexadiene; 1,6-octadiene;
b. branched chain acyclic dienes such as: 5-methyl-1,4-hexadiene; 3,7-dimethyl-1,6-octadiene; 3,7-dimethyl-1,7-octadiene and the mixed isomers of dihydromyrcene and dihydroocimene;
c. single ring alicyclic dienes such as: 1,4-cyclohexadiene; 1,5-cyclooctadiene; and 1,5-cyclododecadiene;
d. multi-ring alicyclic fused and bridged ring dienes such as: tetrahydroindene; methyltetrahydroindene; dicyclopentadiene; bicyclo-(2,2,1)-hepta-2,5-diene; alkenyl, alkylidene, cycloalkenyl and cycloalkylidene norbornenes such as 5-methylene-2-norbornene (NMB), 5-ethylidene-2-norbornene (ENB), 5-(4-cyclopentenyl)-2-norbornene; 5-cyclohexylidene-2-norbornene.

Of the non-conjugated dienes typically used to prepare these copolymers, dienes containing at least one of the double bonds in a strained ring are preferred. The most preferred diene is 5-ethylidene-2-norbornene (ENB). The amount of diene (wt. basis) in the copolymer could be from about 0% to 20%, with 0% to 15% being preferred. The most preferred range is 0% to 10%.

As already noted, the most preferred copolymer for the narrow MWD copolymer is ethylene-propylene or ethylenepropylene-diene. In either event, the average ethylene content of the copolymer could be as low as about 10% on a weight basis. The preferred minimum is about 25%. A more preferred minimum is about 30%. The maximum ethylene content could be about 90% on a weight basis. The preferred maximum is about 85%, with the most preferred being about 80%.

The molecular weight of the narrow MWD copolymer can vary over a wide range. It is believed that the weight average molecular weight could be as low as about 2,000. The preferred mininum is about 10,000. The most preferred minimum is about 20,000. It is believed that the maximum weight average molecular weight could be as high as about 12,000,000. The preferred maximum is about 1,000,000. The most preferred maximum is about 750,000.

The molecular weight distribution (MWD) of the narrow MWD copolymer is very narrow, as characterized by at least one of a ratio of $\overline{M}_w/\overline{M}_n$ of less than 2 and a ratio of $\overline{M}_z/\overline{M}_w$ of less than 1.8. As relates to EPM and EPDM, some typical advantages of such copolymers having narrow MWD are greater resistance to shear degradation, and when compounded and vulcanized, faster cure and better physical properties than broader MWD materials.

The narrow MWD copolymer is produced by polymerization of a reaction mixture comprised of catalyst, ethylene and at least one additional alpha-olefin monomer. Solution polymerizations are preferred.

Any known solvent for the reaction mixture that is effective for the purpose can be used in conducting such solution polymerizations. For example, suitable solvents are hydrocarbon solvents such as aliphatic, cycloaliphatic and aromatic hydrocarbon solvents, or halogenated versions of such solvents. The preferred solvents are $C_{12}$ or lower, straight chain or branched chain, saturated hydrocarbons, $C_5$ to $C_9$ saturated alicyclic or aromatic hydrocarbons or $C_2$ to $C_6$ halogenated hydrocarbons. Most preferred are $C_{12}$ or lower, straight chain or branched chain hydrocarbons, particularly hexane. Nonlimiting illustrative examples of solvents are butane, pentane, hexane, heptane, cyclopentane, cyclohexane, cycloheptane, methyl cyclopentane, emthyl cyclohexane, isooctane, benzene, toluene, xylene, chloroform, chlorobenzenes, tetrachloroethylene, di-chloroethane and trichloroethane.

The composition of the narrow MWD copolymers can vary between chains as well as along the length of the chain. It is preferable to minimize the amount of interchain variation, which, as indicated, is measured by Inter-CD. Inter-CD is characterized by the fraction and total composition differences as more fully explained at column 7, lines 49-64 of COZEWITH et al., and is measured by techniques using solvent compositions, as also more fully described in this portion of the patent.

It is preferred that the Inter-CD of the copolymer is such that 95 wt.% of the copolymer chains having an ethylene composition that differs from the copolymer average weight percent ethylene composition by 15 wt.% or less. The preferred Inter-CD is about 13% or less, with the most preferred being about 10% or less.

It is also preferred that the Intra-CD of the narrow MWD copolymer be such that at least two portions of an individual intramolecularly heterogeneous chain, each portion comprising at least 5 weight percent of the chain, differ in composition from one another by at least 5 weight percent ethylene. The Intra-CD can be such that at least two portions of copolymer chain differ by at least 10 weight percent ethylene. Differences of at least 20 weight percent, as well as of at least 40 weight percent ethylene, are also considered to be in accordance with the present invention. Having a polymer chain which is rich in propylene at one end and rich in ethylene at the other end is advantageous for morphology and property control in blends of polyethylene and polypropylene plastics with EDM and EPDM copolymers.

Intra-CD for the narrow MWD copolymer is established by an experimental procedure wherein Inter-CD is first established as previously discussed, and the polymer chain is then broken into fragments alongs its contour, whereupon the Inter-CD of the fragments is determined. The difference in the two results is due to Intra-CD, as more fully represented at the illustrative example at column 8, line 33 through column 9, line 31 of COZEWITH et al.

In order to determine the fraction of a polymer which is intramolecularly heterogenous in a mixture of polymers combined from several sources, the mixture must be separated into fractions which show no further heterogeneity upon subsequent fractionation. These fractions are subsequently fractured and fractionated to reveal which are heterogeneous.

The properties of the required fragments, and the necessary fractionation technique, are described in detail at column 9, line 39 through column 10, line 38 of COZEWITH et al.

Ethylene content for the narrow MWD copolymer can be measured by ASTM tests, and proton and carbon 13 nuclear magnetic resonance, as more fully described at column 10, lines 39-54 of COZEWITH et al.

Molecular weight and molecular weight distributions can be measured by chromatography techniques, and numerical analyses are performed by computer, as more fully described at column 10, line 55 through column 11, line 8 of COZEWITH et al.

The polymerization process for producing a single mode narrow MWD copolymer should be conducted such that:
a. the catalyst system produces essentially one active catalyst species;
b. the reaction mixture is essentially free of chain transfer agents; and
c. the polymer chains are essentially all initiated simultaneously, which is at the same time for a batch reactor, or at the same point along the length of the tube for a tubular reactor.

The narrow MWD copolymer may be produced in a mix-free reactor system, which is one in which substantially no mixing occurs between portions of the reaction mixture that contain polymer chains initiated at different times. A suitable process, as disclosed in COZEWITH et al., employs a tubular reactor with a catalyst system that gives essentially one active catalyst species, selecting polymerization conditions such that all the polymer chains are initiated at the reactor inlet, and chain transfer is substantially absent along the tube length.

As disclosed in COZEWITH et al., a single continuous flow stirred tank reactor (CFSTR) will mix polymer chains initiated at different times, and is therefore not suitable for producing the narrow MWD copolymer. However, it is well known that 3 or more stirred tanks in series with all of the catalyst fed to the first reactor can approximate thee performance of a tubular reactor. Accordingly, such tanks in series are considered to be in accordance with the present invention, and fall within the term "tubular" as used herein.

Another suitable reactor is a batch reactor, preferably equipped with adequate agitation, to which the catalyst, solvent, and monomer are added at the start of the polymerization. The charge of reactants is then left to polymerize for a time long enough to produce the desired product. For economic reasons, a tubular reactor is preferred to a batch reactor for performing the processes of this invention.

The temperatures of the narrow MWD reaction mixture should also be kept within certain limits. The temperature at the ractor inlet should be high enough to provide complete, rapid chain initiation at the start of the polymerization reaction. The length of time the reaction mixture spends at high temperature must be short enough to minimize the amount of undesirable chain transfer and catalyst deactivation reactions.

Temperature control of the narrow MWD reaction mixture, as described more fully in COZEWITH et al., is maintained by using prechilled feed and operating the reactor adiabatically. As an alternative to feed prechill, a heat exchanger, as more fully described in COZEWITH et al., may be employed. Well known autorefrigeration techniques may be used in the case of batch reactors or multiple stirred reactors in series.

If adiabatic reactor operation is used, the inlet temperature of the reactor feed could be about from $-50°$ C. to 150° C. It is believed that the outlet temperature of the reaction mixture could be as high as about 200° C. The preferred maximum outlet temperature is about 70° C. The most preferred maximum is about 50° C.

Certain reaction parameters for the process of producing the narrow MWD copolymer, such as preferred maximum copolymer concentration at the reactor outlet, flow rate of the reaction mixture, and residence time of the reaction mixture in the mix-free reactor for the process of making the narrow MWD copolymer, are more fully described at column 17, line 57 through column 18, line 23 of COZEWITH et al.

Briefly as to these parameters, the most preferred maximum polymer concentration at the reactor outlet is 15 wt/100 wt diluent, with a preferred mininum of 2 wt/100 wt diluent, and a most preferred minimum of at least 3 wt/100 wt diluent. As to residence time, a preferred minimum is about 10 seconds, and a most preferred minimum is about 15 seconds; the maximum could be as high as about 3,600 seconds, with a preferred maximum of about 1,800 seconds, and a most preferred maximum of about 900 seconds. The flow rate should be high enough to provide good mixing of the reactants in the radial direction and minimize mixing in the axial direction.

Additional solvents and reactants may be added along the length of a tubular reactor, or during the course of polymerization in a batch reactor.

In the process for making the narrow MWD copolymer, it is essential that the polymer chains are all initiated simultaneously.

In addition to the disclosed reactor systems, others having the benefit of the present disclosure may be employed. Further, more than one reactor could be used in parallel, or in series with a multiple monomer feed.

Accordingly, processes for producing a single mode narrow MWD copolymer in accordance with the present invention are carried out:

(a) in at least one mix-free reactor,
(b) using a catalyst system that produces essentially one active catalyst species,
(c) using at least one reaction mixture which is essentially transfer agent-free, and
(d) in such a manner and under conditions sufficient to initiate propagation of essentially all polymer chains simultaneously.

Any of the process means disclosed in the COZE-WITH et al. patent, using the reaction components, parameters, additives, and apparatus also disclosed therein, may be employed to produce the narrow MWD copolymer. The $\overline{M}_w/\overline{M}_n$ value of this copolymer will be less than 2.0, and as low as 1.2–1.5.

As more fully described at column 13, line 64 through column 14, line 25, of COZEWITH et al., the catalyst used in the process for producing the narrow MWD copolymer should preferably be such as to yield essentially one active catalyst species in the reaction mixture. As also more fully discussed at this portion of COZE-WITH et al., additional active catalyst species can be present which produce as much as 35% by weight of the total copolymer, but preferably less than 10% or less by weight of the copolymer, if only the narrow MWD polymer is to be formed. Accordingly, where only the narrow MWD polymer is to be formed, the one active species should provide for at least 65%, or preferably at least 90%, of the total copolymer produced.

Techniques for measuring the activity of and for characterizing catalyst species are discussed at column 14, lines 14–25 of COZEWITH et al.

The catalyst systems employed in producing the narrow MWD copolymer may be those disclosed in COZEWITH et al., prepared as disclosed in this patent.

Catalyst system to be used in carrying out processes for producing the narrow MWD copolymer may be Ziegler catalysts, which may typically include:

(a) a compound of a transition metal, i.e., a metal of Groups I-B, III-B, IV-B, VI-B, VII-B, and VIII of the Periodic Table, and
(b) an organometal compound of a metal of Groups I-A, II-A, II-B and III-A of the Periodic Table.

The preferred catalyst system in practicing processes in accordance with the present invention comprises a hydrocarbon soluble vanadium compound, in which the vanadium valence is 3 to 5, an organo-aluminum compound, with the proviso that the catalyst system yields essentially one active catalyst species as described above. At least one of the vanadium compound/organo-aluminum pair selected must also contain a valence-bonded halogen.

In terms of formulas, vanadium compounds useful in practicing processes in accordance with the present invention could be:

where
X = 0–3 and R = a hydrocarbon radical;
VCl$_4$;
VO(AcAc)$_2$,
where AcAc = acetyl acetonate;
V(AcAc)$_3$;

$$VOCl_x(AcAc)_{3-x}, \quad (2)$$

where x = 1 or 2;
VCl$_3$.nB, and mixtures thereof
where n = 2–3 and B = Lewis base capable of making hydrocarbon-soluble complexes with VCl$_3$, such as tetrahydrofuran, 2-methyl-tetrahydrofuran and dimethyl pyridine.

In formula (1) above, R preferably represents a C$_1$ to C$_{10}$ aliphatic, alicyclic or aromatic hydrocarbon radical such as ethyl (Et), phenyl, isopropyl, butyl, propyl, n-butyl, i-butyl, hexyl, cyclohexyl, octyl, naphtyl, etc. Non-limiting, illustrative examples of formula (1) compounds are vanadyl trihalides, alkoxy halides and alkoxides such as VOCl$_3$ VOCl$_2$(OBu) where Bu=butyl, and VO(OC$_2$H$_5$)$_3$. The most preferred vanadium compounds are VCl$_4$, VOCl$_3$, and VOC$_2$(OR).

As already noted, the co-catalyst is preferably an organo-aluminum compound. In terms of chemical formulas, these compounds could be as follows:

| | |
|---|---|
| AlR$_3$, | Al(OR')R$_2$ |
| AlR$_2$Cl, | R$_2$Al—O—AlR$_2$ |
| AlR'RCl, | AlR$_2$I |
| Al$_2$R$_3$Cl$_3$, | |
| AlRCl$_2$, | and mixtures thereof | where R and R' represent hydrocarbon radicals, the same or different, as described above with respect to the vanadium compound formula.

A preferred organo-aluminum compound is Al$_2$R$_3$Cl$_3$.

The most preferred organo-aluminum co-catalyst is ethyl aluminum sesquichloride (EASC)-Al$_2$Et$_3$Cl$_3$.

Where the catalyst system used in producing the narrow MWD copolymer comprises VCl$_4$ and Al$_2$R$_3$Cl$_3$, preferably where R is ethyl, the mole ratio of aluminum/vanadium, as more fully described as column 15, lines 37–54 of COZEWITH et al., should be at least 2, with a preferred minimum of about 4, and a maximum of about 25, a preferred maximum of about 17, and a most preferred maximum of about 15.

The catalyst system can be selected, and the reactor temperature set, so that negligible chain transfer with aluminum alkyl or propylene occurs along the reactor length. Essentially all chain growth must start near the catalyst feed point. These requirements can be met with catalyst systems containing EASC.

The catalyst components are preferably premixed, as is described in COZEWITH et al. in more detail, and aged prior to introduction in to the reactor. The preferred minimum aging period is about 0.1 second. More preferably, this period is about 0.5 seconds; most preferably, about 1 second. The maximum aging period is about 200 seconds, or, more preferably, about 100 seconds. Most preferably, this period is about 50 seconds.

The premixing can be performed at temperatures of 40° C. or below. More preferably, premixing is performed at 25° C. or below; most preferably, at 15° C. or below.

The elastomer composition comprising a narrow MWD copolymer and a broad MWD copolymer, is also suitable for use in the blends of the invention.

The narrow MWD component of this composition is the narrow MWD copolymer previously described, prepared by the indicated processes.

No restrictions apply to processes for producing the broader MWD copolymer which are well known. This process can be practiced with a variety of catalyst systems and polymerization conditions, provided that the desired quantity and molecular weight of polymer is obtained. The same monomers, solvents, and catalysts as disclosed for producing the narrow MWD copolymer may be used to produce the broader MWD copolymer. Reaction parameters may be varied to produce the broader MWD of this copolymer. Such reaction parameters which may be varied are temperature at the inlet and/or outlet of the reactor, as well as through the body of the reactor.

Chain transfer agents such as hydrogen or diethyl zinc, as disclosed in COZEWITH et al., may be added to the process to broaden MWD.

MWD may further be broadened by catalyst deactivation, as disclosed in COZEWITH et al.

MWD may further be broadened by adding diethyl aluminum chloride (DEAC) to the reaction.

The broader MWD copolymer may be prepared in a tubular reactor or in a stirred tank. The stirred tank may be a continuous flow stirred tank reactor (CFSTR).

According to one novel process for producing the narrow-broad MWD composition, a first reactor or reactors operating at conditions chosen to produce the narrow MWD copolymer can be operated in series or in parallel with a second reactor operating to produce the broader MWD copolymer. The second tubular reactor can be separate from the first reactor, or it can be an extension thereof, as long as the correct polymerization conditions are imposed.

When the second reactor is a continuous flow stirred reactor, typical operating conditions are a temperature of 20°–70° C. and a residence time of 5–60 minutes. The exit polymer concentration from this reactor is preferably in the range of 2 wt/100 wt diluent to 20 wt/100 wt diluent. Any of the catalyst systems previously disclosed can be used in the second reactor to form the second polymer. It is well known in the art that the choice of catalyst components used in a continuous flow stirred reactor influences the MWD of the polymer produced. By proper selection of the catalyst, a second polymer with $\overline{M}_w/\overline{M}_n$ between 2 and 100 can be obtained.

The narrow-broad MWD composition can be formed by first preparing the narrow MWD copolymer in a mix free tubular reactor. This process utilizes conditions sufficient to simultaneously initiate propagation of all copolymer chains of the narrow MWD copolymer, and the reaction mixture employed comprises a catalyst for generating essentially one catalyst species having a life longer than the residence time in the reactor. Then, this narrow MWD copolymer is reacted in a stirred tank reactor with additional monomer to form the broader MWD copolymer.

The composition can also be produced by preparing the broader MWD copolymer in a second tubular reactor operated in parallel with the tubular reactor used to prepare the narrow MWD copolymer, and then blending the products.

The composition can be prepared in the tubular reactor used to prepare the narrow MWD copolymer. The broader MWD copolymer of the blend can be formed by injecting a catalyst, or a transfer agent, or additional reaction mixture, at least one location along the tubular reactor.

Where the narrow MWD copolymer comprises ethylenepropylene-coupling agent containing chains, the broader MWD copolymer components can be prepared by cross-linking the coupling agents to nodularize a portion of the chains, and the nodular chains are then blended with the narrow MWD chains.

Another means comprises first preparing the broader MWD copolymer in a tubular reactor by means of a catalyst suitable for preparing this copolymer, and then injecting a catalyst suitable for preparing the narrow MWD copolymer, and, alternatively, also injecting additional monomer, to initiate the reaction for forming the narrow MWD copolymer.

In the case where broad and narrow components are generated "simultaneously", the reactor is mix-free only for the narrow MWD catalyst component. Initiation of the broad MWD component would extend over a period of time which is comparable to chain lifetime, and may overlap at some point with initiation of the narrow MWD copolymer. Substantially no mixing occurs between portions of the reaction mixture that contain polymer chains initiated by the narrow MWD catalyst at different times.

In the mix-free tubular reactor employed to prepare the narrow MWD copolymer, the broader MWD copolymer can be prepared by recycling a portion of the narrow MWD copolymer from the reactor outlet to a point along the reactor.

Another means for preparing the narrow-broad composition in a single mix-free tubular reactor is by adding, during the process for preparing the narrow copolymer, catalyst reactivator, and, optionally, additional monomers, downstream of the reactor inlet to form the broader MWD copolymer component.

The narrow MWD copolymer can be prepared in a mix-free batch reactor, utilizing conditions sufficient to simultaneously initiate propagation of all copolymer chains of the narrow MWD copolymer. The reaction mixture employed comprises a catalyst for preparing essentially one catalyst species, and is essentially free of transfer agents.

The narrow-broad MWD composition can also be formed by employing a batch reactor, and then adding the resulting narrow MWD copolymer to the broad MWD copolymer. It can also be formed by preparing the broader MWD copolymer in a batch reactor, and thereafter blending it with the first copolymer made in the batch reactor.

The narrow and broad MWD copolymers can be simultaneously formed in a single batch reactor by introducing into the reaction mixture both catalyst for generating essentially one catalyst species, to produce the narrow MWD copolymer, and by also introducing a catalyst suitable for forming the second copolymer.

The copolymers disclosed in the previously indicated Application No. Ser. No. 840,562, comprising a superposition of two or more narrow MWD copolymers, and hereinafter referred to, for convenience, as polymodal copolymers, are also suitable for use with the blends of this invention.

As previously indicated, single mode MWD copolymers are produced by carrying out a polymerization reaction:
(a) in at least one mix free reactor,
(b) using catalyst systems such that each component or mode in a MWD is produced by essentially one active catalyst species,
(c) using at least one reaction mixture which is essentially transfer agent-free, and
(d) in such a manner and under conditions sufficient to initiate propagation of essentially all polymer chains made with a particular catalyst species simultaneously.

To produce the polymodal MWD copolymer, these polymerization conditions are used to generate each of the narrow MWD modes that comprise the final polymer product. A number of techniques are available for achieving this:

(1) In a single mix free reactor operated as described above, portions of the polymer product can be withdrawn after varying times in a batch reactor or at varying distances along a tubular reactor representing different average molecular weights and these portions can be blended.

(2) Mix-free reactors can be operated either in parallel or sequentially and the products blended.

(3) Two or more catalysts that form narrow MWD polymer of differing molecular weight can be added at the onset of polymerization in a mix-free reactor. Each catalyst must meet the requirements of minimizing chain transfer and initiating simultaneous propagation of all the chains produced by that catalyst.

(4) A catalyst system that generates multiple active catalyst species can be added at the start of the polymerization. Each catalyst species produced must give simultaneous chain initiation and minimize chain transfer.

(5) Additional catalyst and monomer, if desired, can be added at varying lengths along a tubular reactor, or times in a batch reactor, to initiate the formation of additional MWD modes. The catalysts can be the same or different, as long as chains are initiated simultaneously and chain transfer is minimized.

(6) For catalyst systems that show a decay in activity as a function of time due to deactivation, catalyst reactivator can be added during the course of the polymerization to regenerate the dead catalyst and form a new mode of narrow MWD copolymer.

Catalyst reactivators are well known in the art for increasing the productivity of vanadium Ziegler catalysts. These materials rejuvenate catalyst sites that have become inert due to termination reactions, and thereby cause reinitiation of polymer chain growth. When added to a reactor operating according to the process of this invention, catalyst reactivators have an effect similar to that of adding a second catalyst feed. Many reactivators are known, and examples of suitable materials can be found in U.S. Pat. Nos. 3,622,548, 3,629,212, 3,723,348, 4,168,358, 4,181,790 and 4,361,686. Esters of chlorinated organic acids are preferred reactivators for use with the vanadium catalyst systems of this invention. Especially preferred is butyl perchlorocrotonate.

In the processes that utilize multiple catalysts or multiple catalysts additions during the course of polymerization, the mix free condition of the reactor refers to the polymer chains of each individual mode of the MWD and not to the polymer as a whole.

A preferred multiple catalyst system comprises $VCl_4$ combined with $VOCl_3$ and an alkyl aluminum sesquihalide as a cocatalyst. The resultant polymer is a bimodal MWD polymer.

The end-capped, star, graft, and block copolymers disclosed in the previously indicated Application Ser. No. 813,848 are also suitable for use with the blends of this invention.

In the process disclosed therein, ethylene propylene polymerizations are capped by a capping agent having at least one functional group which permits it to attach to the polymer end chain. Most preferably, the copolymers upon which the end capping function is performed are EPM copolymers and EPDM terpolymers, as previously disclosed. Further, prior to end capping the copolymer is preferably a narrow MWD copolymer.

The polymerization process is most preferably performed:
(a) in at least one mix-free reactor,
(b) using a catalyst system that produces essentially one active catalyst species,
(c) using at least one reaction mixture which is essentially transfer agent-free, and
(d) in such a manner and under conditions sufficient to initiate propagation of essentially all polymer chains simultaneously.

After growing the polymer chains to the desired molecular weight, end capping agent is fed to add one or more end capping units to the polymer chain, or to produce a structure grafted by the ethylene alpha-olefin chains.

It will be understood that, depending upon the desired functionality of the chains, end capping units which have one or a multiplicity of functionalities, and which themselves may or may not polymerize, are introduced into the reactor.

As noted above, the end cap units may have one or more than one functionality.

Unifunctional end capping units may be selected from the group consisting of: $-CO_2H$ (1), $-OH$ (2), $-SH$ (3), $-X$ (4), $-C-C-$benzene (5), $-C-C-$(pyridine) (6), $-SO_2H$ (7), $-SO_3H$ (8), and mixtures thereof, wherein X is a halide selected from the group consisting of fluorine, chlorine, bromine, and iodine.

The capping agents used to prepare the above capping units, as numbered, are:

  (1)

  (2)

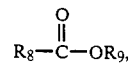

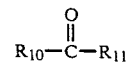

wherein $R_6$ through $R_{11}$ are selected from the group consisting of alkyl having 1–30 carbon atoms, saturated or unsaturated, branched or unbranched, aliphatic, aromatic, cyclic, or polycyclic hydrocarbons;

| | |
|---|---|
| sulfur and $H_2C=S$ | (3) |
| fluoride, chloride, bromide, iodine, and mixtures thereof | (4) |
| styrene | (5) |
| vinyl pyridine | (6) |
| $SO_2$ | (7) |
| $SO_3$ | (8) |

In the case of unsaturated ester and ketone capping agents, ketone and ester functionality, in addition to hydroxyl functionality, may be produced.

By way of example only, the following capping units may be used: acetaldehyde, methyl acetate, and methyl ethyl ketone.

The chains are then used as is, or may be nodularized as disclosed in the previously indicated Application Ser. No. 813,511.

In yet another approach, the end cap may be composed of one monomer, or a polymer chain of the monomers to form a novel composition composed of the original alpha-olefin chain which is coupled to the monomer or polymer chain, i.e., a graft copolymer. Where the functional group is incorporated as a polymer, the polymer itself may be formed prior to or after being linked to the original polymer.

In this embodiment the functional group may be incorporated as a polymer unit selected from the group consisting of:

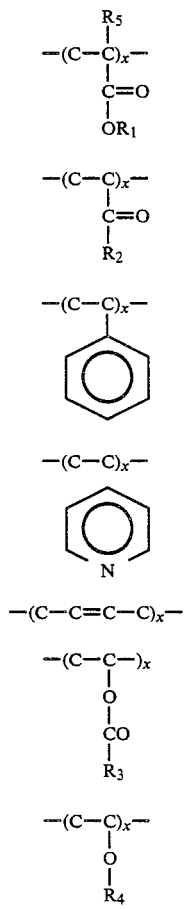

the monomers thereof, and mixtures thereof; wherein $R_1$ through $R_4$ are selected from the group consisting of: alkyl having 1–30 carbon atoms, saturated or unsaturated, branched or unbranched, aliphatic, aromatic, cyclic, or polycyclic hydrocarbons, and $R_5$ is the same as $R_4$ but may additionally be hydrogen, and wherein $x = 1-10,000$.

Specific compounds include: polycylacrylate, polymethylvinylketone, and polystyrene.

The process of the invention used to end cap with the above monomers or polymers comprises reacting the growing chain, respectively, with the following capping agents:

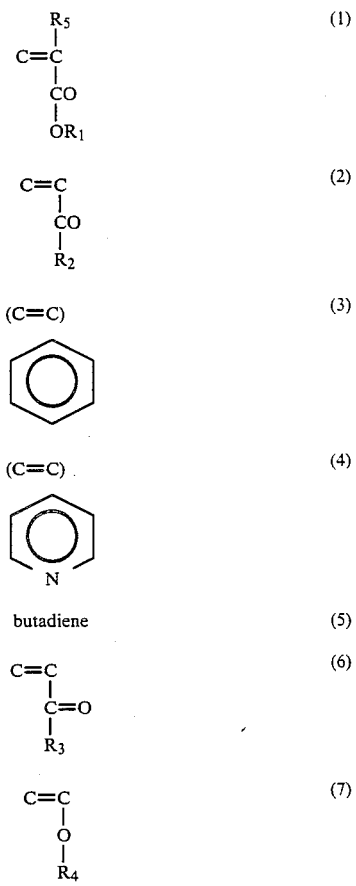

Specific compounds include: decylacrylate, methylvinyl ketone, styrene, vinyl pyridine, vinyl acetate, methyl vinyl ether, and methyl methacrylate.

End capping with any of the above agents (1)–(7) may be performed by injecting the capping agent into the polymerization reactor to quench further ethylene alphaolefin Ziegler-Natta polymerization, after which the end capping reagent itself may be polymerized to form a block copolymer. For further polymerization to occur in this fashion the catalyst used in the original polymerization must be capable of polymerizing the agent by some mechanism, either anionic, radical, cationic, or coordination.

This additional polymerization of the agent may be formed in the same reactor, or in a different reactor.

As previously stated, end capped copolymers are suitable for blending with plastics compositions. Moreover, they may be employed as compatibilizers in blends of EPM and EPDM copolymers with plastic compositions, especially engineering resins, such as nylons, polycarbonates, polyesters, acetals, and polyphenylene oxides. When used for such purposes, they are preferably present in such blends at up to approximately 80 percent by weight of the blend.

The end capping group may be polymeric, in which case star shaped or graft polymers may be formed. These polyfunctional end capping groups may be selected from the grop of copolymers consisting of: copolymers of ethylene and vinylacetate (1); ethylene and acrylic acid esters (2); vinyl acetate and fumaric acid esters (3); styrene and maleic acid esters (4); olefins and maleic acid esters (5); homopolyacrylates (6); and epoxidized natural rubber (7).

The nodular copolymers disclosed in the previously indicated Application Ser. No. 813,511 are also suitable for use with the blends of this invention.

These nodular copolymers comprises ethylene, at least one alpha-olefin monomer, and a non-conjugated diene copolymer. Prior to coupling, the individual polymer chains of the nodular copolymer have at least one segment that contains only ethylene and the alpha-olefin, and a second segment that contains ethylene, the alpha-olefin, and the non-conjugated diene. Prior to the formation of the nodular branched copolymer the copolymer is a narrow MWD copolymer, as defined herein.

The processes for preparing these nodular copolymers are most preferably carried out:

(a) in at least one mix-free reactor,
(b) using a catalyst system that produces essentially one active catalyst species,
(c) using at least one reaction mixture which is essentially transfer agent-free, and
(d) in such a manner and under conditions sufficient to initiate propagation of essentially all polymer chains simultaneously.

To form the nodular copolymers, the polymer chains formed in the polymerization are coupled by reacting the residual double bonds, in the non-conjugated diene in one polymer chain, with similar double bonds in other chains. The coupling reaction can be catalyzed by either Ziegler, cationic, free radical catalysts, or olefin coupling agents.

The preferred reactor for preparing these copolymers is a tubular reactor. When polymerizing in a tube, the ethylene and propylene are fed to the reactor inlet along with a suitable Ziegler catalyst. The catalyst is preferably chosen so that it produces essentially one active catalyst species. Also, chain transfer reactions during the polymerization must be minimized. It is well known that ethylene is much more readily polymerized than propylene. Consequently, the concentration of monomer changes along the tube in favor of propylene as the ethylene is depleted. The result is copolymer chains which are higher in ethylene content in the chain segments grown near the reactor feed inlet and higher in propylene in the segments grown near the reactor outlet. The resulting chain is intramolecularly heterogeneous. The extent of heterogeneity in ethylene/propylene compositions can be moderated somewhat by feeding additional ethylene at points along the reactor to keep the ethylene/propylene monomer ratio at a more constant value. An object is to produce chains with a minimum of interchain compositional variation in order to assure uniform coupling. This is accomplished by utilizing a Ziegler catalyst that forms essentially one active catalyst species, minimizing chain transfer reactions initiating propagation of essentially all chains simultaneously, and conducting the polymerization such that the major portion of the catalyst remains active for the entire length of time that polymerization is occurring in the reactor. The tubular reactor is also operated at conditions such that the copolymer chains have a narrow MWD characterized by at least one of the ratios of $\overline{M}_w/\overline{M}_n$ and $\overline{M}_z/\overline{M}_w$ being less than 2.0 and 1.8, respectively, prior to coupling.

In one embodiment, polymerization of the ethylene and propylene is initiated at the reactor inlet and continued until a first polymer segment forms comprising at least 50% of the weight of the total polymer to be produced. Additional monomer feed is then added to the tube consisting of non-conjugated diene, either alone or in combination with the other monomer and/or solvent. At the point of non-conjugated diene addition, at least 50% of the ultimate anticipated mass of the polymer should have been formed. A second chain segment is then formed with a non-conjugated diene content of at least 0.1 mole 1% and with a $\overline{M}_w$ value of at least 2000. If the first polymer segment is formed as a series of discontinuous segments, the first segment shall be considered to include the segments as a whole for definitional purposes.

Several techniques are available for producing the nodular branched polymer of this invention. If the non-conjugated diene has both double bonds polymerizable by the Ziegler catalyst, branching will occur simultaneously with polymerization in the reactor. In this case the polymer exiting the reactor will be the final product.

If coupling is to be catalyzed cationically, the cationic catalyst can either be added to the tubular reactor, to carry out the coupling in the reactor, or to the polymer product exiting the reactor so that the coupling can be carried out in a separate process step. Free radical coupling catalysts are normally Ziegler catalyst poisons and will not perform at polymerization conditions. In this case, the coupling agent must be added, and the coupling performed, subsequent to the polymerization. Olefin cross-linking agents may also be used in a similar manner.

As already noted, the first copolymer segment in accordance with the present invention is comprised of ethylene and at least one other alpha-olefin. It is believed that such alpha-olefin could include those containing 3 to 18 carbon atoms, e.g., propylene, butene-1, pentent-1, etc. Alpha-olefins of 3 to 6 carbons are preferred due to economic considerations. The most preferred alpha-olefin in accordance with the present invention is propylene.

The diene monomers suitable for use in the practice of this invention by which the narrow MWD polymers prepared by this invention are coupled, are of two types: (1) non-conjugated dienes capable of being Ziegler catalyst polymerized via both double bonds; and (2) the non-conjugated dienes of the type used to prepare EPDM where the non-conjugated dienes has only one Ziegler catalyst polymerizable double bond, and the other bond is cross-linkable by cationic or free radical catalysts, or by olefin cross-linking agents.

Typical of the coupling agents that can be used to produce the second terpolymer segment of the chain are the following non-limiting examples:

(a) straight chain acyclic dienes such as: 1,4-hexadiene; 1,6-octadiene;

(b) branched chain acyclic dienes such as: 5-methyl-1, 4-hexadiene; 3,7-dimethyl-1, 6-octadiene; 3,7-dimethyl-1, 7-octadiene and the mixed isomers of dihydromyrcene and dihydroocimene;

(c) single ring alicyclic dienes such as: 1,4-cyclohexadiene; 1,5-cyclooctadiene; and 1,5-cyclododecadiene;

(d) multi-ring alicyclic fused and bridged ring dienes such as: teetrahydroindene; methyltetrahydroindene; dicyclopentadiene; bicyclo-(2,2,1)-hepta-2,5 diene; alkenyl, alkylidene, cycloalkenyl and cycloalkylidene norbornenes such as 5-methylene-2norbornene (MNB), 5-ethylidene-2-norbornene, 5-(4-cyclopentenyl)-2-norbornene; and 5-cyclohexylidene-2-norbornene.

Illustrative, non-limiting examples of the diene monomers coupled by Ziegler copolymerization catalysts to prepare the nodular polymers of this invention are norbornadiene, vinyl norbornene and butenyl norbornene. Illustrative of the dienes coupled by cationic cross-linkable catalyst to prepare the nodular polymers are 1,4-hexadiene, ENB, and dicylopentadiene. Illustrative of the dienes coupled by free radical catalysts are MNB, VNB, and 1,5-hexadiene. Additionally, olefin cross-linking agents may be used. Such agents include sulfur dichloride, dusulfenyl halides, borane, dithioalkenes, and mixtures thereof. Of the non-conjugated dienes typically used to prepare these copolymers, dienes containing at least one of the double bonds in a strained ring are preferred. The amount of diene (mol basis) in the diene-containing segment of the polymer could be from about 0.1% mole to 50%, with 1% to 30% being preferred. The most preferred range is 2%-20%.

The average ethylene content of the polymer could be as low as about 10% on a weight basis. The preferred minimum is about 25%. A more preferred minimum is about 30%. The maximum ethylene content could be about 90% on a weight basis. The preferred maximum is about 85%, with the most preferred being about 80%. The ethylene content of the two segments comprising the polymer can be the same or different. If different, the preferred composition range for each segment is the same as stated above for the whole polymer.

The molecular weight of copolymer made in accordance with the present invention can vary over a wide range. It is believed that the weight average molecular weight could be as low as about 2,000. The preferred minimum is about 10,000. The most preferred minimum is about 20,000. It is believed that the maximum weight average molecular weight could be as high as about 12,000,000. The preferred maximum is about 1,000,000. The most preferred maximum is about 750,000. The preferred minimum molecular weight for an ethylene-propylene copolymer chain segment is $2 \times 10^4$. For the ethylene-propylene-non-conjugated diene chain segment the preferred minimum MW is $2 \times 10^3$.

In one embodiment, the nodular copolymer is prepared by beginning the polymerization of the poly co-(ethyleneproplene) which is permitted to grow to a molecular weight of several tens of thousands, e.g., 10,000 to 50,000 number average molecular weight. The polymerization of the copolymer will generally have proceeded to about 50% of the total anticipated weight of polymer at the end of polymerization, more preferably at least 70% of the total weight; at that point in time, the diene monomer, and optionally, a cationic catalyst if the diene is subject to cationically catalyzed coupling are introduced into the reactor with or without additional ethylene and propylene. With Ziegler copolymerizable dienes the polymer copolymerizes with the double bonds of the diene monomer to form the nodular polymers of this invention. This diolefin copolymerizes at the chain ends coupling several chains. Alternatively, coupling agent may be added at the entrance to the tubular reactor with a part of the ethylene and alpha-olefin monomer, polymerization being carried out until nodules are formed and the coupling agent is substantially converted; then additional ethylene and alpha-olefin are added to grow nodular polymers of this invention.

The olefinic chlorosilane and olefinic halide copolymers of the previously identified Application Ser. No. 813,980 are also suitable for use with the blends of this invention.

These copolymers may be statistical (random) or segmented copolymers comprising ethylene, alpha-olefin, and halogen-containing monomer which is an olefinic hydrocarbon chlorosilane or an olefinic halide. The segmented copolymer may be in nodular form.

These copolymers may further be in the form of graft and clock polymers formed from the copolymer chains.

The olefinic chlorosilane has the formula $$SiRR'_xCl_{3-x}$$

wherein x is in the range of 0-2, R is a Ziegler copolymerizable olefin, and R' is a hydrocarbon with 1-30 carbon atoms selected from the group consisting of saturated or saturated as well as branched or unbranched aliphatic, aromatic, cyclic, and polycyclic hydrocarbons. R may further be selected from the group consisting of norbornenyl, dicyclopentenyl, and 1-hexenyl. The chlorosilane may further be selected from the formula $$CH_2=CH-(CRR')_n-SiR_xCl_{3-x}$$

wherein x is in the range of 0-2, n is greater than or equal to 0, and R and R' are the same or different, each being a hydrocarbon with 1-30 carbon atoms selected from the group consisting of saturated or unsaturated as well as branched or unbranched aliphatic, aromatic, cyclic, and polycyclic hydrocarbons. In a preferred embodiment, the chlorosilane is selected from the group consisting of vinyl dimethyl chlorosilane, vinyl ethyl dichlorosilane, 5-hexenyldimethylchlorosilane, 5-hexenyltrichlorosilane, 7-octenyltrichlorosilane, and phenyl allyldichlorosilane.

The olefinic hydrocarbon halide has the formula $$RR'X$$

wherein
(i) R is a Ziegler copolymerizable olefin;
(ii) R' is a hydrocarbon with 1-30 carbon atoms selected from a group consisting of the saturated or unsaturated as well as branched or unbranched aliphatic aromatic, cyclic, and polycyclic hydrocarbons; and
(iii) X is a halogen. Then preferred olefinic hydrocarbon halides are 5-parachloromethyl phenyl-2-norbonene and 5-chloromethyl-2-norbonene.

These copolymers are prepared by a polymerization process conducted:
(a) in at least one mix-free reactor, (b) using a catalyst system that produces essentially one active catalyst species, (c) using at least one reaction mixture which is essentially transfer agent-free, and (d) in such a manner and under conditions sufficient to initiate propagation of essentially all polymer chains simultaneously.

A tubular reactor is preferred for the process.

The composition of the copolymer is dependent upon the point at which the various reactants are added to the reactor. In a tubular reactor, the statistical polymer will result if the halogen-containing monomer is added at the reactor inlet and is present along essentially the entire length of the reactor. The segmented copolymer will result if the halogen-containing monomer is instead added at one or more location sites along the reactor with additional ethylene and alpha-olefin appropriately fed; the copolymer chains will bear second segments corresponding to such locations where the olefinic chlorosilane or olefinic hydrocarbon halide is added.

The copolymer chains can be cross-linked at their chlorosilane or olefinic halide functional groups. Where the third comound in the copolymer is an olefinic chlorosilane, the cross-linking agent is water or at least one polyfunctional proton donors. Where the halogen-containing monomer is olefinic hydrocarbon halide, the cross-linking agent is zinc oxide or a polyfunctional nucleophile.

The structure of the resulting cross-linked copolymer is also dependent upon the sequence of monomers along the copolymer chains. Where the olefinic chlorosilane or olefinic hydrocarbon halide has been introduced at the reactor inlet, and the olefinic chlorosilane or olefinic hydrocarbon halide is present throughout the chain, cross-linking will accordingly occur throughout the chain. Where the olefinic chlorosilane or olefinic hydrocarbon halide is rather introduced at one or more locations along the reactor, at such addition rates which will cause the formation of copolymer chains having contiguous first and second segments of sufficient length, cross-linking will result in nodular regions of second segments with first segments extending therefrom.

Variations of such nodular copolymer products can be prepared by adding polyfunctional proton donors or polyfunctional nucleophiles which contain additional functional groups. Examples of such functional groups are amides, pyridines, polycaprolactones, pyrrolidone, imidazole, polycaprolactams, etc.

These copolymers can also be used to make block and graft polymers, including compatibiliserz and thermoplastic elastomers.

In one embodiment the copolymer chains are reacted with a metalating agent, such as a branched alkyl lithium. An anionically polymerizable monomer is then added, which polymerizes anionically to give chains of the monomer grafted onto the ethylene-alpha-olefin copolymer chains.

The halogen-containing monomer copolymers, upon mixing with certain plastics, will chemically link with such plastics through the olefinic chlorosilane or olefinic hydrocarbon halide.

Where the halogen-containing monomer is olefinic chlorosilane, the polymer will react with polycarbonates, polyamides, polyesters, polyephenylene oxides, and acetals. The plastic reacts with the polymer to form a silicon-plastic bond, releasing hydrogen from the plastic and halogen from the olefinic chlorosilane.

Where the halogen-containing monomer is olefinic hydrocarbon halide, the copolymer will react with polyamides (nylons). The $NH_2$ group of the polyamide reacts with the olefinic-hydrocarbon halide. Here too, hydrogen is released from the plastic and halogen from the halogen-containing monomer.

In another embodiment a cationic catalyst, such as a Lewis acid, is reacted with the hydrocarbon halogen functionality on the copolymer chains, and a cationically polymerizable monomer is then added to graft onto the copolymer chains.

Among the plastic compositions which can be used in the blend of this invention are thermoplastic compositions. Suitable thermoplastic compositions include polypropylenes, polyethylenes, including high density polyethenes, low density polyethylenes, and linear low density polyethylenes, polystyrenes, polyvinyl chlorides, polycarbonates, polyamides (nylons), polyesters, polyphenylene oxides, ethylene/methylacrylate copolymers, polybutylenes, polyvinyl acetates, ethylene/vinyl acetate copolymers, polymethyl methacrylates, acrylontrile-butadienne-styrenes, acetals, alkyds, acrylics, polyethyl methacrylates, and heteroblock propylene-ethylene copolymers.

Polypropylene, particularly that having greater than 90% hot heptane insolubles and melt flow rates of 0.2 to 100, especially 4 to 20 b/10 minutes, are particularly preferred for use with the compositions of this invention.

One or more of such plastic compositions can be used together. A preferred combination is that of polypropylene and polyethylene.

Additional suitable plastic compositions are heteroblock propylene-ethylene copolymers. These copolymers, known in the art, are block or random thermoplastic copolymers, as opposed to the COZEWITH et al. elastomer compositions used in the blends of this invention. These block copolymers contain at least 50% by weight polypropylene, and may further be described as crystalline heteroblock copolymers having a crystalline melting point greater than 150° C.

These block copolymers may be prepared by means of a sequential polymerization. In one such process, wherein the polypropylene is prepared in a first reactor and transmitted to a second reactor, wherein ethylene and propylene are added to produce the copolymer. Examples of reactions for making these block copolymers are shown in HOLZER et al., U.S. Pat. No. 3,262,992, and CASTAGNA, U.S. Pat. No. 3,937,758.

At least 50% by weight of the polypropylene in these block copolymers is present as isotactic polypropylene, which provides the thermoplastic character to these polymers.

The blends of this invention can also include fillers, stabilizers, antioxidants, processing aids, colorants, and other known additives, if desired, in conventional amounts.

Preferred plastic compositions for the blends of this invention are polypropylene and heteroblock propylene-ethylene copolymer. Polyethylene, such as low density polyethylene (LDPE), linear low density polyethylene (LLDPE), or high density polyethylene (HDPE) can further be included in the blend.

The blends of the invention may be prepared by any conventional means. The blending is generally conducted at a temperature above the melting point of the plastic, usually at 150° C. or higher. Conventional mixing apparatus such a Banbury Batch Mixer, a Farrel Continuous Mixer, a single screw extruder, or a double screw extruder may be employed. Kneading or roller milling of the blend may also be utilized.

The time required for mixing depends upon the quantity of components in the blend and the type of mixing apparatus; generally, no more than a few minutes is required.

At the temperature and shear rate at which the blend is being produced, the rates of the viscosity of the elastomer of the invention to the viscosity of the polypropylene should be less than approximately 4.0, preferably approximately 0.3 to approximately 3.0. This will give an intimate dispersion of the elastomer in the plastic.

For the purpose of obtaining the desired viscosity ratio, the viscosity of the elastomer and propylene at the shear rate and temperature of the mixing apparatus can be estimated by a constant rate capillary rheometer, such as the Monsanto Processability Tester (MPT).

With these data, it is therefore possible to select a suitable combination of the two components such that the viscosity of the elastomer, under the appropriate temperature and shear rate conditions, is approximately 0.3 to 4.0 times, preferably approximately 0.3 to 3.0 times, that of the polypropylene in which it is to be dispersed.

Subsequent to the blending step, the blends can be molded in any conventional molding equipment, such as injection molding machines or extruders, utilizing molding cycles, temperatures, and pressures which will bring about the desired shape and thickness of the molded article.

Generally, injection molding may take place at temperatures in the range of approximately 174°–315° C. for 05–10 minutes or more, and injecting into a room-temperature mold at 500 to 3,000 psi, depending upon the desired shape and thickness of the molded article.

The elastomer of the blends of the invention, and the polyethylene, when present, can be cured after blending, and during or prior to the molding step.

Curing may be performed by adding to the blend an amount of a curing agent, such as a free radical generating or crosslinking agent, sufficient to cause substantially complete crosslinking of these cross-linkable components, and subjecting them to curing conditions, e.g., a temperature in the range of approximately 175°–205° C.

Organic peroxides are suitable for use as curing agents. Examples of useful organic peroxides include dicumal peroxide, di-tertiary butyl peroxide, tert-butyl perbenzoate, bis (a,a-dimethylbenzyl) peroxide, 2, 5-bis (tert.-butylperoxy)-2,5-dimethylhexane, a,a' bis (tert.-butylperoxy) diisopropylbenzene, and others containing tertiary carbon groups, to name a few. Mixed peroxide-filler type curing systems or packages may also be employed if desired, such as Vulcup R 40 KE, sold by Hercules Incorporated, which is comprised about 40 wt.% a,a-bis(t-butylperoxy) diisopropylbenzene on Burgess KE clay. Another example of a suitable peroxide-filler cure package includes Dicup R 40 KE, which contains 40 wt.% dicumyl peroxide on Burges KE clay, also sold by Hercules Incorporated.

Phenolic curatives and cure activators are also suitable as curing agents.

The particular amoung of curing agent required to provide full curing is well known in the art, and may be readily determined by reference to appropriate literature provided by Hercules Incorporated, Wilmington, Del. By way of example, an organic peroxide is generally used in amounts of from about 0.5 to about 4 parts, preferably from about 1 to about 3 parts, per 100 parts of cross-linkable rubber and polyethylene.

Triallylcyanurate is preferably incorporated into the mixture prior to curing, for the purpose of enhancing the curing and preventing degradation of the plastic composition.

Where the plastic compositions of the blends of the invention comprise polypropylene and polyethylene, the polypropylene generally comprises at approximately 70–95% by weight of the blend; the polyethylene, 2–20%; the elastomer composition, 2–28%.

Where polypropylene and polyethylene are employed, the elastomer compositions of the blends of the invention may be preblended with the polyethylene prior to blending with the polypropylene.

When the composition of the invention comprises approximately 50% by weight or more, preferably up to approximately 80%, and, most preferably, up to approximately 75% by weight, of the elastomer, and approximately 50% or less by weight polypropylene, subjecting the composition to the previously disclosed curing step will result in a product known as a thermoplastic elastomer. Such a product exhibits both thermoplastic and elastomeric properties, i.e, the product will process like a thermoplastic, but have physical properties like elastomers. Shaped articles can be formed from such a product by extrusion, injection molding or compression molding without requiring vulcanization.

The previously indicated elastomeric compositions disclosed in the COZEWITH et al. patent an applications can be employed in the techniques discussed in Coran et al., U.S. Pat. No. 4,130,535 and Abdou-Sabet et al., U.S. Pat. No. 4,311,628, the disclosures of which are hereby incorporated by reference thereto, to prepare the thermoplastic elastomers of the invention.

Where the plastic composition of the blend of the invention is primarily polypropylene comprising approximately 90% or more by weight of the blend, and the elastomer composition is primary single mode narrow MWD copolymer comprising approximately 10% or less by weight of the blend, the blend will comprise a continuous phase of the polypropylene with a discontinuous phase of narrow MWD copolymer dispersed therein. As the proportion of narrow MWD copolymer in the blend is increased above 10% by weight of the blend, at some point the continuous-discontinuous phases configuration of the blend will transform into a cocontinuous phases configuration.

Where polyethylene is also present, and the polypropylene comprises approximately 85% or more by weight of the blend, with the polyethylene comprising approximately 5% or less and the single mode narrow MWD copolymer comprising approximately 10% or less by weight of the blend, the blend will also assume a continuous-discontinuous phase configuration; the discontinuous phase will be in the form of particles having an inner region of polyethylene and an outer surface of narrow MWD copolymer.

The presence of the elastomer composition compatibilizes the polyethylene and polypropylene by rendering the blending of these two plastic compositions easier.

Various properties for certain narrow MWD copolymers suitable for use with the blends of this invention are shown in Table I.

TABLE I

| Polymer | Wt. % Ethylene | $M_L(1+8, 127°C.)$ | Wt. % Diene(1) | $\overline{M}_w$ | $\overline{M}_w/\overline{M}_n$ |
|---|---|---|---|---|---|
| A | 39.0 | 40 | 0 | 190,000 | 1.4 |
| B | 47.0 | 40 | 0 | 176,000 | 1.4 |
| C | 65.0 | 15 | 0 | 140,000 | 1.5 |
| D | 65.0 | 50 | 0 | 190,000 | 1.4 |
| E | 50.0 | 28 | 5.0 | 100,000 | 1.5 |
| F | 73.0 | 75.0 | 5.3 | — | — |

(1) 5-ethylidene-2-norbornene

The composition and properties of two blends, both employing a 5 MFR polypropylene homopolymer, one further employing an elastomer known in the art and the other employing a narrow MWD copolymer of the invention, are listed in Table II.

TABLE II

Evaluation of Elastomer Blended With a 5 MFR Polypropylene Homopolymer

| Sample No. | 1 (Control) | 2 |
|---|---|---|
| Composition | | |
| Vistalon 503(1) wt. % (grams) | 10.05 (1273) | — |
| Polymer B, wt. % (grams) | — | 10.05 (1273) |
| Polyethylene(2) wt. % (grams) | 4.93 (624) | 4.93 (624) |
| Polypropylene(3) wt. % (kilograms) | 85.0 (10.8) | 85.0 (10.8) |
| Irganox 1076, wt. % (grams) | 0.02 (3) | 0.02 (3) |
| Mechanical Properties | | |
| Melt Flow Rate @ 230° C., g/10 min. | 4.3 | 4.8 |
| Izod Impact Strength, ft.-lb./in. | | |
| 21° C., notched | 1.2 | 1.0 |
| −18° C., notched | 0.57 | 0.54 |
| −30° C., unnotched | 10.1 | 9.7 |
| −30° C., unnotched knit line | 2.1 | 2.6 |
| Gardner Impact Strength, in.-lb | | |
| −18° C. | 135 | 138 |
| −30° C. | 112 | 126 |
| Flexural Modulus, secant, psi × $10^{-3}$ | 160.1 | 161.3 |
| Tensile Strength @ break, psi | 3678 | 3978 |
| Knit line Tensile, psi | 2385 | 2783 |

(1) Exxon Chemical Americas EPM: Mooney Viscosity ($M_L 1 + 8' @ 127°$ C.) = 30; 49 wt % ethylene
(2) 0.3 MI, 0.95 g/cc density
(3) Polypropylene MFR = 5

The composition and properties of three blends, all employing a 12 MFR polypropylene homopolymer while each of the other two employs a narrow MWD copolymer of the invention, are comparatively listed in Table III.

TABLE III

Evaluation of Elastomer Blended with 12 MFR Polypropylene Homopolymer

| Sample No. | 3 (Control) | 4 | 5 |
|---|---|---|---|
| Composition | | | |
| Vistalon 503(1), wt. % (grams) | 6.7 (2010) | — | — |
| Polymer A, wt. % (grams) | — | 6.7 (2010) | — |
| Polymer B, wt. % (grams) | — | — | 6.7 (2010) |
| Polyethylene(2) wt. % (grams) | 3.28 (984) | 3.28 (984) | 3.28 (984) |
| Polypropylene(3), wt. % (kg) | 90.0 (27) | 90.0 (27) | 90.0 (27) |
| Irganox 1076, wt. % (grams) | 0.02 (6) | 0.02 (6) | 0.02 (6) |
| Mechanical Properties | | | |
| Melt Flow Rate @ 230° C. g/10 min. | 9.2 | 9.6 | 9.6 |
| Izod Impact Strength, ft.-lb./in. | | | |
| 21° C., notched | 0.70 | 0.62 | 0.55 |
| −18° C., notched | 0.44 | 0.41 | 0.43 |
| −30° C., unnotched | 6.4 | 6.5 | 6.3 |
| −30° C., unnotched knit line | 1.8 | 1.8 | 2.7 |
| Gardner Impact Strength, in.-lb | | | |
| −18° C. | 71 | 83 | 80 |
| −30° C. | 45 | 78 | 74 |
| Flexural Modulus, secant, psi × $10^{-3}$ | 120.9 | 124.4 | 121.1 |
| Tensile Strength @ break-psi | 4552 | 4680 | 4633 |
| Knit line Tensile, psi | 2622 | 2785 | 3655 |

(1) Exxon Chemical Americas EPM: Mooney Viscosity ($M_L 1 \times 8' @ 127°$ C.) = 30; 49 wt% ethylene
(2) 0.3 MI, 0.95 g/cc density
(3) Polypropylene MFR = 12

The composition and properties of 5 additional blends, all employing a 15 MFR polypropylene homopolymer, one further employing an elastomer known in the art and the others each further employing a narrow MWD copolymer of the invention, are comparatively listed in Table IV.

TABLE IV

Evaluation of Elastomer Blended with 15 MFR Polypropylene Homopolymer

| Sample No. | 6 (Control) | 7 | 8 | 9 | 10 |
|---|---|---|---|---|---|
| Composition | | | | | |
| Vistalon 503(1) wt. % (kg) | 10.05 (8.5) | — | — | — | — |
| Polymer B, wt. % (kg) | — | 10.05 (8.5) | — | — | — |
| Polymer C, wt. % (kg) | — | — | 10.05 (8.5) | — | — |
| Polymer D, wt. % (kg) | — | — | — | 10.05 (8.5) | — |
| Polymer E, wt. % (kg) | — | — | — | — | 10.05 (8.5) |
| Polyethylene(2) wt. % (kg) | 4.93 (4.18) | 4.93 (4.18) | 4.93 (4.18) | 4.93 (4.18) | 4.93 (4.18) |
| Polypropylene(3) wt. % (kg) | 85.0 (72.0) | 85.0 (72.0) | 85.0 (72.0) | 85.0 (72.0) | 85.0 (72.0) |
| Irganox 1076, wt. % (kg) | 0.02 (0.02) | 0.02 (0.02) | 0.02 (0.02) | 0.02 (0.02) | 0.02 (0.02) |
| Mechanical Properties | | | | | |
| Melt Flow Rate @ 230° C. g/10 min. | 10.9 | 10.5 | 14.9 | 10.6 | 11.5 |
| Izod Impact Strength, ft.-lb./in. | | | | | |
| 21° C., notched | 0.76 | 0.77 | 0.63 | 0.65 | 0.76 |
| −18° C., notched | 0.44 | 0.54 | 0.34 | 0.35 | 0.53 |
| −30° C., unnotched | 6.0 | 6.9 | 4.8 | 4.2 | 7.8 |
| −30° C., unnotched knit line | 1.8 | 2.7 | 3.1 | 2.2 | 2.2 |
| Gardner Impact Strength, in.-lb | | | | | |
| −18° C. | 62 | 88 | 15 | 30 | 146 |
| −30° C. | 56 | 66 | 8 | 18 | 121 |
| Flexural Modulus secant, psi × $10^{-3}$ | 168.9 | 174.3 | 162.3 | 187.5 | 175.1 |
| Ten. Strength @ break, psi | 2367 | 2419 | 1890 | 2744 | 2382 |
| Knit line Tensile, psi | 3320 | 3410 | 2052 | 3620 | 2540 |

(1) Exxon Chemical American EPM: Mooney Viscosity ($M_L 1 + 8' @ 127°$ C.) = 30; 49 wt % ethylene
(2) 0.3 MI, 0.95 g/cc density
(3) Polypropylene = 15 MFR

TABLE V

Evaluation of Narrow MWD copolymer in Thermoplastic Olefin (TPO) Formulations

| Sample No. | 11 | 12 | 13 | 14 | 15 |
|---|---|---|---|---|---|
| Composition | | | | | |
| Vistalon 503[1] wt. % (g) | 25.0 (375) | — | — | — | — |
| Vistalon 7000[2] wt. % (g) | — | 25.0 (375) | — | — | — |
| Polymer F, wt. % (g) | — | — | 25.0 (375) | — | — |
| Polymer C, wt. % (g) | — | — | — | 25.0 (375) | — |
| Polymer D, wt. % (g) | — | — | — | — | 25.0 (375) |
| Polypropylene,[3] wt. % (g) | 74.8 (1122) | 74.8 (1122) | 74.8 (1122) | 74.8 (1122) | 74.8 (1122) |
| Irganox 1076, wt. % (g) | 0.2(3) | 0.2(3) | 0.2(3) | 0.2(3) | 0.2(3) |
| Mechanical Prpoerties | | | | | |
| Melt Flow Rate @ 230° C., g/10 min | 3.55 | 2.45 | 2.54 | 4.51 | 3.80 |
| Spiral Flow[4], cm | 15.6 | 14.6 | 12.5 | 15.2 | 14.8 |
| Izod Impact Strength, ft-lb/in | | | | | |
| 21° C., notched | 10.1 | 7.9 | 2.0 | 4.0 | 7.3 |
| −20° C., unnotched | 28.4 | 24.9 | 21.1 | 13.8 | 15.0 |
| −30° C., unnotched | — | — | 16.3 | 12.9 | 13.7 |
| −40° C., unnotched | — | — | 10.3 | 9.0 | 11.0 |
| Ten. Strength @ Break-psi | 2510 | 2510 | 1920 | 2220 | 2330 |
| Enlongation @ Break, % | 300 | 290 | 145 | 210 | 170 |
| Flexural Modulus, psi × $10^{-3}$ | 120 | 125 | 129 | 116 | 120 |

[1]Exxon Chemical Americas EPM: Mooney Viscosity ($M_L$ 1 + 8'@ 127° C.) = 30; 49 wt. % ethylene
[2]Exxon Chemical Americas EPDM: Mooney Viscosity ($M_L$ 1 + 8'@ 127° C.) = 55; 70 wt. % ethylene; 5 wt. % ENB
[3]Polypropylene MFR = 5.0
[4]Non-standard test for comparison purposes; higher values indicate better mold filling characteristics. Conditions using Boy laboratory injection press: Pressure = 800 psi; barrel temperature 230° C.; nozzle temperature 267° C.; mold at 53° C.; 13 second injection; 20 second hold

TABLE VI

Thermoplastic Olefins (TPO's) Containing Marrow MWD Copolymer Plus Talc

| Sample No. | 16 | 17 | 18 |
|---|---|---|---|
| Composition | | | |
| Polymer C, wt. % (g) | 31.0 (465) | 30.0 (450) | 28.0 (420) |
| Mistron Vapor, wt. % (g) | 5.0 (75) | 10.0 (150) | 15 (225) |
| Heteroblock propylene-ethylene co-polymer[1] wt. % (g) | 63.8 (957) | 59.8 (897) | 56.8 (852) |
| Irganox 1076 wt. % (g) | 0.2 (3) | 0.2 (3) | 0.2 (3) |

[1]Hetero block propylene-ethylene copolymer is a 15 MFR polymer containing 88 percent by weight of a polypropylene block and 12 percent by weight of a postblock of a copolymer of ethylene and propylene, the postblock containing 40 weight percent ethylene.

The following examples more particularly illustrate the nature of the invention but are not intended to be limitative thereof. In the following examples, the mechanical property evaluations were made employing the following tests.

| TEST FOR | VIA | ASTM |
|---|---|---|
| Melt Processability | MFR | D1238 L |
| Stiffness | Flexural Modulus | D790 I.A. |
| Stiffness Properties | Tensile & Elongation at yield and break | D638 |
| Impact Strength | Notched Izod | D256, Method A |
| | Unnotched Izod | D256, Method A |
| | Gardner Impact | D3029 |

Test specimens for measuring the above mechanical properties were produced on a Watson Stillman Injection Molding Machine.

EXAMPLE 1

Two impact propylene blends were made and compared for impact properties and knit line strength. One blend was prepared with a commercially available ethylene propylene copolymer (Vistalon 503) having a MWD of 4.5. The other was prepared with Polymer B of Table II.

Each blend was prepared by initially mixing the copolymer and HDPE in a Banbury Mixer for 4 minutes at a temperature of about 200° C. The copolymer/HDPE mixture was then pelletized and mixed with a polypropylene homopolymer in a Banbury Mixer for about 4 minutes at approximately 200°. The mechanical properties of the 2 blends are also set forth in Table II.

The results of Table II illustrate that incorporation of a narrow MWD ethylene-propylene copolymer in a 5 MFR polypropylene blend provides improved knit line properties while maintaining all other properties approximately constant.

EXAMPLE 2

Impact polypropylene copolymer blends were prepared with narrow MWD copolymers in accordance with the formulations set forth in Table III. For purposes of comparison, an impact polypropylene blend was prepared with Vistalon 503, a commercially available copolymer having a MWD of 4.5.

Each of the blends was prepared by initially mixing the copolymer and HDPE in a Banbury Mixer for 4 minutes at a temperature of about 200° C. Each copolymer/HDPE mixture was then cooled and chopped in small squares.

The final impact copolymer blend was prepared by mixing the copolymer/HDPE mixture with a polypropylene homopolymer in a 2.5 inch Royle extruder. The die temperature of the extruder was approximately 200° C. The mechanical properties of these blends are set forth in Table III.

As illustrated, the blends containing the narrow MWD copolymer had improved impact and knit line properties.

EXAMPLE 3

Impact copolymer blends were prepared with narrow MWD copolymers in accordance with the formulations set forth in Table IV. As in example 2, one blend was prepared with Vistalon 503 for comparison purposes.

Each of the blends was prepared in accordance with the procedure set forth in Example 2. The mechanical properties of the blends are set forth in Table IV.

As with the narrow MWD blends of Example 2, Samples 7 and 10 had better impact properties than the Vistalon 503 blend, Sample 6. Furthermore, Sample 8 had better Izod knit line properties than the control, but lower Gardner impact properties.

EXAMPLES 4

Five thermoplastic olefins (TPO) were made and compared for mechanical properties. For comparison purposes, two of the blends were prepared with commercially available EPM/EPDM elastomers.

Each blend was prepared by mixing the copolymer and polypropylene homopolymer in a Banbury mixer for about 4 minutes at approximately 200° C. After completing mixing, the copolymer-polypropylene blend was cooled and granulated. The mechanical properties and polymer components of all the TPO blends prepared are set forth in Table V.

EXAMPLE A

Three thermoplastic olefins (TPO) are made in accordance with the formulations set forth in Table VI. Each blend is prepared by mixing the heteroblock propylene-ethylene block copolymer, mistron vapor and narrow MWS copolymer in a Banbury mixer for about 4 minutes at approximately 200° C. After completing mixing, the blend is cooled and granulated.

EXAMPLE B

A moderately filled flexible compound for extrusion, molding and thermoforming applications is prepared in accordance with the formulation below:

| Polymer C[(1)] | 23 wt. % | (345 grams) |
|---|---|---|
| Ethylene/Vinyl Acetate Copolymer | 36 wt. % | (540 grams) |
| Flexon 766 oil | 10 wt. % | (150 grams) |
| Atomite - C Co$_3$ | 30 wt. % | (450 grams) |
| Stearic Acid | 0.6 wt. % | (9 grams) |
| Irganox 1076 | 0.4 wt. % | (6 grams) |

[(1)]2.5 MI; 19% VA

The blend is prepared by mixing Polymer C, ethylene/vinyl acetate copolymer, Flexon 766 oil and atomite in a Banbury mixer at high rotor speed until flux (approximately 2 minutes). After flux, the blend is mixed for another 3 minutes at low rotor speed. Next, the stearic acid and Irganox 1076 are added to the blend, and the blen is mixed for another minute at low rotor speed. Finally, the blend is dumped, cooled and granulated.

EXAMPLE C

An impact polypropylene blend is made by blending 3.4 wt.% (51 grams) of Polymer C, 1.7 wt.% (26 grams) of a 0.3 MI HDPE, 0.8 wt.% (12 grams) of Irganox 1076 and 94.1 wt.% (1424 grams) of a 4 MFR heterblock propylene ethylene copolymer containing 90 percent by weight of a polypropylene block and 10 percent by weight of a postblock of a copolymer of ethylene and propylene, the postblock containing 40 weight percent ethylene in a Banbury mixer for 4 minutes at 200° C. After completing mixing, the blend is cooled and granulated.

EXAMPLE D

A thermoplastic olefin (TPO) is prepared by mixing 49.5 wt.% (750 grams) of Polymer C, 9.9 wt.% (150 grams) of Sunpar 2280 oil, 0.99 wt.% (15 grams) of Irganox 1010 and 39.6 wt.% (600 grams) of a 4 MFR heteroblock propylene ethylene copolymer containing 88 percent by weight of a polypropylene block and 12 percent by weight of a postblock of a copolymer of ethylene and propylene, the postblock containing 40 weight percent ethylene, for approximately 4 minutes in a Banbury mixer at 200° C. After completing mixing, the blend is cooled and granulated.

EXAMPLE E

A thermoplastic elastomer is prepared in accordance with the formulation shown below:

| Polymer E | 750 grams | (50 wt. %) |
|---|---|---|
| Profax 6823PP (0.4 MFR) | 251 grams | (16.7 wt. %) |
| Nucap 190 Clay | 159 grams | (10.6 wt. %) |
| Titanium Dioxide | 21 grams | (1.4 wt. %) |
| Sun-O-Lite 127 | 21 grams | (1.4 wt. %) |
| Sunpar 150 oil | 239 grams | (15.9 wt. %) |
| SP 1045 Resin | 44 grams | (2.9 wt. %) |
| ZnO | 9 grams | (0.6 wt. %) |
| Stannous Chloride | 7.5 grams | (0.5 wt. %) |

The blend is prepared by mixing Polymer E, Profax 6823 PP, Nucap 190 Clay, Titanium Dioxide, and Sun-O-Lite 127 in a Banbury Mixer at high rotor speed until flux (about 2 minutes). After flux, 119.5 grams of the oil is added and the blend is mixed for 1 minute. Next, the remainder of the oil is added and the blend is mixed for another minute. With the oil in the blend, the SP 1045 Resin is added and mixed for 20 seconds. Then, the ZnO and stannous chloride are added and the blend is mixed for 6 minutes at a low rotor speed. (Temperature is about 200°.) Finally, the blend is dumped, cooled and granulated.

EXAMPLE F

A thermoplastic elastomer is prepared in accordance with the formulation shown below:

| Polymer E | 860 grams | (57.3 wt. %) |
|---|---|---|
| Profax 6823PP (0.4 MFR) | 251 grams | (16.7 wt. %) |
| Nucap 190 Clay | 159 grams | (10.6 wt. %) |
| Titanium Dioxide | 21 grams | (1.4 wt. %) |
| Sun-O-Lite 127 | 21 grams | (1.4 wt. %) |
| Sunpar 150 oil | 129 grams | (8.6 wt. %) |
| SP 1045 Resin | 44 grams | (2.9 wt. %) |
| ZnO | 9 grams | (0.6 wt. %) |
| stannous chloride | 7.5 grams | (0.5 wt. %) |

The blend is prepared by mixing Polymer E, Profax 6823 PP, Nucap 190 Clay, Titanium Dioxide, and Sun-O-Lite 127 in a Banbury Mixer at high rotor speed until flux (about 2 minutes). After flux, the oil is added the blend is mixed for 1 minute. Next, the SP 1045 resin is added and the blend is mixed for another 20 seconds. Then, the ZnO and Stannous chloride are added and the blend is mixed for 6 minutes at a low rotor speed. (Temperature is about 200°.) Finally, the blend is dumped, cooled and granulated.

What is claimed is:
1. A composition comprising:
   (a) at least one elastomer copolymer comprising ethylene and at least one other alpha-olefin, having a weight average molecular weight of at least 20,000, and at least one of $\overline{M}_w/\overline{M}_n$ less than 2 and $\overline{M}_z/\overline{M}_w$ less than 1.8, wherein at least two portions of essentially each copolymer chain of said copolymer, each portion comprising at least about 5 wt. % of the chain, differ in composition from one another by at least about 5 wt.% ethylene; and
   (b) at least one plastic composition.
2. A composition as defined by claim 1 wherein said at least one plastic composition comprises a continuous phase and said at least one copolymer comprises a discontinuous phase dispersed within the continuous phase.
3. The composition as defined by claim 1 wherein said at least one copolymer has a $\overline{M}_w/\overline{M}_n$ less than 1.4.
4. The composition as defined by claim 1 wherein said at least one copolymer has a $\overline{M}_z/\overline{M}_w$ less than 1.3.

5. The composition as defined by claim 1 wherein said at least one plastic composition is selected from the group consisting of thermoplastic compositions.

6. The composition as defined by claim 5 wherein said at least one plastic composition comprises a continuous phase and said at least one copolymer comprises a discontinuous phase dispersed within the continuous phase.

7. The composition as defined by claim 5 wherein said at least one plastic composition is a thermoplastic composition selected from the group consisting of polypropylenes, polyethylenes, ethylene/vinyl acetate copolymers, polyamides, polyphenyl oxides, polycarbonates, ethylene/methyl acrylate copolymers, polymethyl methacrylates, polyvinyl chlorides, acrylonitrile-butadiene-styrenes, polyethyl methacrylates, polystyrenes, polybutylenes, polyesters, acetals, alkyds, polyvinyl acetates, acrylics, and heteroblock propylene-ethylene copolymers.

8. The composition as defined by claim 7 wherein said at least one thermoplastic composition is polypropylene.

9. The composition as defined by claim 7 wherein said at least one thermoplastic composition comprises polypropylene and polyethylene.

10. The composition as defined by claim 9 comprising at least approximately 70-95% by weight propylene, 2-20% by weight polyethylene, and approximately 2-28% by weight of said at least one copolymer.

11. The composition as defined by claim 8 comprising approximately 2-50% by weight of said at least one copolymer, and approximately 98-50% by weight of said polypropylene.

12. The composition as defined by claim 2 wherein said at least one plastic composition is polypropylene, and comprises at least approximately 90 wt. % of the composition, and wherein the at least one copolymer is at least one member selected from the group consisting of ethylene-propylene copolymer and ethylene-propyleneterpolymer, and comprises approximately 10 wt. % or less of the composition.

13. The composition as defined by claim 1 wherein said at least one copolymer is an ethylene alpha-olefin copolymer wherein the alpha-olefin monomer contains 3-18 carbon atoms.

14. The composition as defined by claim 2 wherein said at least one copolymer is an ethylene-propylene copolymer.

15. The composition as defined by claim 1 wherein said at least one copolymer is such that 95 wt.% of the copolymer chains of said at least one copolymer have an ethylene composition that differs from its average weight percent ethylene composition by 15 wt.% or less.

16. A cured composition according to claim 1.

17. The composition as defined by claim 16 comprising more than approximately 50% and up to approximately 80% by weight of the at least one copolymer, and approximately 50% or less by weight polypropylene.

* * * * *

UNITED STATES PATENT AND TRADEMARK OFFICE
CERTIFICATE OF CORRECTION

PATENT NO. : 4,843,129

DATED : June 27, 1989

INVENTOR(S) : L. SPENADEL et al.

It is certified that error appears in the above-identified patent and that said Letters Patent is hereby corrected as shown below:

On the title page of the patent, 1st column, please delete the following:
"Related U.S. Application Data
[63] Continuation-in-part of Ser. No. 813,980, Dec. 27, 1985, abandoned, Ser. No. 813,725, Dec. 27, 1985, and Ser. No. 813,848, Dec. 27, 1985, abandoned, which is a continuation-in-part of Ser. No. 681,950, Dec. 26, 1985, said Ser. No. 813,980, is a continuation-in-part of Ser. No. 813,511, Dec. 26, 1985, which is a continuation-in-part of Ser. No. 681,950, which is a continuation-in-part of Ser. No. 504,582, Jun. 15, 1983, Pat. No. 4,540,753, said Ser. No. 813,725, is a continuation-in-part of Ser. No. 840,562, Dec. 26, 1985, which is a continuation-in-part of Ser. No. 681,951, Dec. 14, 1984, which is a continuation-in-part of Ser. No. 504,582."

At column 1, line 8, delete "This application is a continuation-in-part of the".

At column 1, lines 8 and 9, change "application" to ---Application---.

At column 1, line 10, after "abandoned", change "," to ---.---.

At column 1, line 10, change "application" to ---Application---.

At column 1, line 11, after "1985", add ---.---.

At column 1, line 11, change "application" to ---Application---.

UNITED STATES PATENT AND TRADEMARK OFFICE
CERTIFICATE OF CORRECTION

PATENT NO. : 4,843,129

DATED : June 27, 1989

INVENTOR(S) : L. SPENADEL et al.

It is certified that error appears in the above-identified patent and that said Letters Patent is hereby corrected as shown below:

At column 1, line 14, change "26" to ---16---.
    At column 1, line 20, change "513,511" to ---813,511---.

Signed and Sealed this

Second Day of October, 1990

Attest:

HARRY F. MANBECK, JR.

*Attesting Officer*     *Commissioner of Patents and Trademarks*